(12) United States Patent
Fang et al.

(10) Patent No.: US 12,706,552 B2
(45) Date of Patent: Aug. 11, 2026

(54) PIEZOELECTRIC MOTOR, CAMERA MODULE, AND ELECTRONIC DEVICE

(71) Applicant: HUAWEI TECHNOLOGIES CO., LTD., Shenzhen (CN)

(72) Inventors: Yan Fang, Dongguan (CN); Jun Xie, Dongguan (CN); Li-Te Kuo, Dongguan (CN); Zengping Xing, Shenzhen (CN); Qianyan Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 664 days.

(21) Appl. No.: 18/344,013

(22) Filed: Jun. 29, 2023

(65) Prior Publication Data

US 2024/0007022 A1 Jan. 4, 2024

Related U.S. Application Data

(63) Continuation of application No. PCT/CN2021/142039, filed on Dec. 28, 2021.

(30) Foreign Application Priority Data

Dec. 31, 2020 (CN) ......................... 202011640952.1
Feb. 2, 2021 (CN) ......................... 202110142982.8

(51) Int. Cl.
*H02N 2/02* (2006.01)
*H02N 2/00* (2006.01)
(Continued)

(52) U.S. Cl.
CPC ............. *H02N 2/026* (2013.01); *H02N 2/002* (2013.01); *H02N 2/0065* (2013.01); *H04N 23/55* (2023.01); *H04N 23/57* (2023.01)

(58) Field of Classification Search
CPC ...... H04N 23/57; H04N 23/50; H02N 2/0065; H02N 2/103; H02N 2/026
See application file for complete search history.

(56) References Cited

U.S. PATENT DOCUMENTS 3,958,450 A * 5/1976 Kleesattel ............. G01N 3/405 73/579
5,162,692 A 11/1992 Fujimura
(Continued)

FOREIGN PATENT DOCUMENTS

CN 1866720 A 11/2006
CN 114697493 A 7/2022
(Continued)

OTHER PUBLICATIONS

Extended European Search Report dated Apr. 26, 2024, issued for European Application No. 21914385.6 (9 pages).
(Continued)

*Primary Examiner* — Pedro J Cuevas

(57) ABSTRACT

An electronic device may include a camera module which may include a piezoelectric motor. The piezoelectric motor includes a vibration exciter and a resonator. The resonator includes a main body portion and a push portion, the main body portion includes a first central axis, the main body portion is distributed on two sides of the first central axis, and the vibration exciter is fastened to the main body portion. The push portion is connected to the main body portion and distributed on the two sides of the first central axis, the push portion is of an asymmetrical structure with respect to the first central axis, and the push portion is configured to push, when excited by the vibration exciter, a driven member to move.

20 Claims, 21 Drawing Sheets

(51) Int. Cl.
*H04N 23/55* (2023.01)
*H04N 23/57* (2023.01)

(56) References Cited

U.S. PATENT DOCUMENTS 5,665,918 A * 9/1997 Takano .................. H02N 2/026 73/662
6,373,170 B1 * 4/2002 Hills ...................... H02N 2/026 310/323.18
6,765,335 B2 * 7/2004 Wischnewskiy ....... H02N 2/065 310/366
7,960,896 B2 * 6/2011 Takahashi .............. H02N 2/103 310/323.16
8,482,185 B2 7/2013 Wischnewskij et al.
9,274,660 B2 * 3/2016 Bernstein .............. G06F 3/0227
9,729,086 B2 * 8/2017 Wischnewskiy ......... H02N 2/04
10,134,975 B2 * 11/2018 Karrai .................... H10N 30/20
10,825,981 B2 * 11/2020 Karrai .................... H02N 2/103
11,409,362 B2 * 8/2022 Xing ..................... G06F 3/0202
11,793,080 B2 * 10/2023 Hübner ................ H02N 2/0055 310/317
12,057,789 B2 * 8/2024 Söderkvist ............. H02N 2/007
12,143,036 B1 * 11/2024 Petrenko .............. H02N 2/0025
12,457,903 B2 * 10/2025 Ooi .......................... H03H 9/19
2003/0052573 A1 * 3/2003 Wischnewskiy ....... H02N 2/026 310/322
2007/0164635 A1 7/2007 Witteveen et al.
2009/0058227 A1 * 3/2009 Takahashi .............. H02N 2/108 310/323.16
2011/0175489 A1 * 7/2011 Wischnewskij ..... H10N 30/206 310/323.02
2015/0326147 A1 11/2015 Shimizu et al.
2016/0181505 A1 * 6/2016 Karrai ................... F04B 19/006 310/367
2019/0067554 A1 * 2/2019 Karrai ................... F04B 43/046
2021/0004089 A1 * 1/2021 Xing ......................... G06F 3/02
2022/0187928 A1 * 6/2022 Xing ..................... G06F 3/0202
2022/0278268 A1 * 9/2022 Ooi ...................... H03H 9/1021
2024/0275310 A1 * 8/2024 Oh ....................... H02N 2/0055

FOREIGN PATENT DOCUMENTS

DE 102008026429 A1 * 12/2009 ........... H02N 2/0025
EP 2153476 B1 * 8/2011 ............. H02N 2/103
EP 4258534 A1 * 10/2023 ............. H04N 23/54
JP 04359684 A * 12/1992 ............... H02N 2/00
JP 2009038901 A * 2/2009 ............. G03B 37/02
JP 2011522506 A * 7/2011 ........... H02N 2/0025
JP 5184839 B2 * 4/2013 ............. G03B 37/02
WO WO-2009147037 A1 * 12/2009 ............. H02N 2/103
WO WO-2022143651 A1 * 7/2022 ............. H04N 23/54
WO WO-2025212321 A1 * 10/2025 ........... H02N 2/0015

OTHER PUBLICATIONS

International Search Report dated Mar. 29, 2022, issued for International Application No. PCT/CN2021/142039 (8 pages).

* cited by examiner

PIEZOELECTRIC MOTOR, CAMERA MODULE, AND ELECTRONIC DEVICE

CROSS-REFERENCE TO RELATED APPLICATIONS

This application is a continuation of International Application No. PCT/CN2021/142039, filed on Dec. 28, 2021, which claims priority to Chinese Patent Application No. 202011640952.1, filed on Dec. 31, 2020 and Chinese Patent Application No. 202110142982.8, filed on Feb. 2, 2021. All of the aforementioned patent applications are hereby incorporated by reference in their entireties.

TECHNICAL FIELD

This disclosure relates to the field of photographing technologies, and in particular, to a piezoelectric motor, a camera module, and an electronic device.

BACKGROUND

Currently, a motor of a camera module of an electronic device (for example, a mobile phone) is mainly a moving coil motor. The moving coil motor includes a magnet and a coil. The coil winds around an outer circumferential side of a lens. Under a magnetic field of the magnet, an energized coil generates an electromagnetic force to push the lens to move. However, because the moving coil motor is driven by a magnetic force, and is sensitive to a surrounding magnetic material or magnetic field, magnetic interference is prone to occur, and consequently, photographing quality of the camera module is poor.

SUMMARY

Embodiments of this disclosure provide a piezoelectric motor, a camera module, and an electronic device. The piezoelectric motor uses a piezoelectric drive technology to resolve an electromagnetic interference problem of a conventional motor, and photographing quality of the camera module and the electronic device is better.

According to a first aspect, this disclosure provides a piezoelectric motor, including a vibration exciter and a resonator. The resonator includes a main body portion and a push portion, the main body portion includes a first central axis, the main body portion is distributed on two sides of the first central axis, and the vibration exciter is fastened to the main body portion. The push portion is connected to the main body portion and distributed on the two sides of the first central axis, the push portion is of an asymmetrical structure with respect to the first central axis, and the push portion is configured to push a driven member to move when excited by the vibration exciter.

It should be noted that the main body portion may be of a symmetrical structure with respect to the first central axis, or may be of an asymmetrical structure with respect to the first central axis. This is not strictly limited in the technical solutions of this disclosure.

It may be understood that when no current is supplied to the vibration exciter (a current is zero or a current is very small), the vibration exciter is in an initial state. When a positive current is supplied to the vibration exciter, the vibration exciter extends and is in an elongated state. When a negative current is supplied to the vibration exciter, the vibration exciter shrinks and is in a shortened state. That is, the vibration exciter deforms based on an applied electrical signal. When the electrical signal is an alternating signal, the piezoelectric material periodically shrinks.

In this way, when a current at a specific frequency is supplied to the vibration exciter, the vibration exciter can generate elastic vibration, and amplify the vibration to the resonator through resonance, so that a part of the resonator that come into contact with the driven member forms an elliptical track motion, and relative friction occurs between the resonator and the driven member, to implement a driving function of the piezoelectric motor. The ellipse includes a special ellipse whose long radius is equal to a short radius, that is, a circle.

Specifically, the elastic vibration generated by the vibration exciter can be amplified to the main body portion through resonance, and the main body portion is connected to the push portion. Therefore, the vibration can be transferred to the push portion, so that the push portion can move along the elliptical track, thereby driving the driven member to move relative to the push portion. With the asymmetrical arrangement of a push portion in structure, the push portion has more diversified and variable structural forms, and may further be adjusted for a space size of a camera module to which the piezoelectric motor is applied, to achieve an objective of properly using space. In addition, the resonator can have two resonance modes at different excitation frequencies, so that the driven member performs a directional reciprocating translation motion.

In other words, the resonator can generate two resonance modes when excited by the vibration exciter. That is, the push portion can generate two resonance modes when excited by the vibration exciter. The two resonance modes have different excitation frequencies and opposite vibration forms. Specifically, when excitation of alternating signals at different frequencies is applied to the push portion, the two resonance modes can push the driven member to move toward two opposite directions, thereby implementing the reciprocating translation motion of the driven member.

Therefore, because the piezoelectric motor adopts piezoelectric drive instead of magnetic drive, there is no strong magnetic component inside the piezoelectric motor, so that a possibility of generating magnetic interference to a component disposed around the piezoelectric motor can be minimized, an electromagnetic interference problem of a conventional motor can be effectively resolved, and photographing quality of a camera module to which the piezoelectric motor is applied and an electronic device to which the camera module is applied can be better. In addition, the resonator can implement directional translation motion of the driven member with a relatively simple and easy-to-manufacture structure, so that when the optical structure is fastened on the driven member, the optical structure can be driven to implement directional translation together, to implement a better optical effect.

In a possible implementation, the push portion includes a first side wall and a second side wall, a contact foot configured to come into contact with and match the driven member is formed at a junction between the first side wall and the second side wall, and the first side wall and the second side wall are arranged at an angle.

It should be understood that the first side wall and the second side wall can form an appearance structure of the push portion, and the first side wall and the second side wall are arranged at an angle, that is, the first side wall and the second side wall are not coplanar.

In this way, a top contour of the push portion can be presented as a triangle, and a top of the push portion may be understood as a part that is of the push portion and that is away from the main body portion. This arrangement is conducive to miniaturization of the entire resonator, and can make the push portion have a relatively large overall rigidity, a relatively stable structure, and a relatively good capability of resisting interference from an external environment factor. In addition, because the overall rigidity of the push portion is relatively large, and the push portion comes into contact with and matches the driven member on which the optical structure is fastened, the push portion can push a heavier optical structure. That is, the push portion can periodically and continuously move the optical structure, and a driving force is stable. Therefore, the push portion can push an optical structure with a relatively large weight and a relatively large stroke, so that a structure of the camera module is more easily diversified, and a relatively high photographing requirement for the optical structure is more easily met.

A situation in which the top contour of the push portion is a triangle may include a situation in which the top contour of the push portion is an oblique triangle, a situation in which the top contour of the push portion is an isosceles triangle, a situation in which the top contour of the push portion is a curved-edge triangle, or a situation in which the top contour of the push portion is a round triangle. This is not strictly limited in embodiments of this disclosure.

In a possible implementation, an intersection line between the first side wall and the second side wall deviates relative to the first central axis, a length of the first side wall is not equal to a length of the second side wall, the length of the first side wall is a size of the first side wall in an extension direction, and the length of the second side wall is a size of the second side wall in an extension direction.

For example, the length of the first side wall is not equal to the length of the second side wall, the length of the first side wall is the size of the first side wall in the extension direction, and the length of the second side wall is the size of the second side wall in the extension direction. In this way, the intersection line between the first side wall and the second side wall deviates from the first central axis, and the top contour of the push portion formed by both the first side wall and the second side wall can present a form of an oblique triangle. This helps further ensure an asymmetrical form of the push portion in structure, improve structural stability and rigidity of the push portion, and provide a stable driving force for the driven member.

In a possible implementation, an intersection line between the first side wall and the second side wall intersects with the first central axis.

A length of the first side wall is equal to a length of the second side wall, the length of the first side wall is a size of the first side wall in an extension direction, and the length of the second side wall is a size of the second side wall in an extension direction.

In this way, the top contour of the push portion formed by both the first side wall and the second side wall can present an isosceles triangle. This arrangement can further ensure structural stability and rigidity of the push portion while ensuring a special asymmetrical form of the push portion in structure, and provide a stable driving force for the driven member.

Alternatively, a length of the first side wall is not equal to a length of the second side wall, the length of the first side wall is a size of the first side wall in the extension direction, and the length of the second side wall is a size of the second side wall in the extension direction.

In this way, the top contour of the push portion formed by both the first side wall and the second side wall can present a form of an oblique triangle. This arrangement can improve structural rigidity and structural stability of the push portion while ensuring a special asymmetrical form of the push portion in structure.

In a possible implementation, a hollow region is formed between the push portion and the main body portion. This arrangement enables the push portion to have diversified structural deformation possibilities based on a function of driving the driven member to move, and is conducive to adapting to multi-scenario application requirements of the piezoelectric motor.

Alternatively, the push portion is a solid closed structure.

In a possible implementation, the push portion includes a first connecting arm and a second connecting arm, the first connecting arm and the second connecting arm are respectively connected to two edges on a same side of the main body portion. One end of the first connecting arm away from the main body portion is connected to one end of the second connecting arm away from the main body portion. The first side wall and the second side wall are formed on surfaces that are of the first connecting arm and the second connecting arm and that are away from the main body portion, and the hollow region is enclosed by the first connecting arm, the second connecting arm, and the push portion.

A size of a cross section of the first connecting arm gradually changes in the extension direction, and/or a size of a cross section of the second connecting arm gradually changes in the extension direction.

In this way, the first connecting arm and the second connecting arm can match to form a push portion that includes a hollow region and that can push the driven member. By changing structural forms of the first connecting arm and the second connecting arm, a special asymmetrical form of the push portion with respect to the first central axis can be implemented. However, the asymmetrical arrangement of the push portion in structure can enable the resonator to have two resonance modes at different excitation frequencies as a whole. When the two resonance modes are excited by a corresponding frequency, the driven member can move in two opposite directions, so that the driven member can present directional reciprocating translation motion.

In a possible implementation, the push portion includes a first connecting arm and a second connecting arm, the first connecting arm and the second connecting arm are respectively connected to two edges on a same side of the main body portion. One end of the first connecting arm away from the main body portion is connected to one end of the second connecting arm away from the main body portion. The first side wall and the second side wall are formed on surfaces that are of the first connecting arm and the second connecting arm and that are away from the main body portion, and the hollow region is enclosed by the first connecting arm, the second connecting arm, and the push portion.

A size of a cross section of the first connecting arm remains unchanged in the extension direction, and/or a size of a cross section of the second connecting arm remains unchanged in the extension direction.

In this way, the first connecting arm and the second connecting arm can match to form a push portion that includes a hollow region and that can push the driven member. By changing structural forms of the first connecting arm and the second connecting arm, a special asymmetrical form of the push portion with respect to the first central axis can be implemented. However, the asymmetrical arrangement of the push portion in structure can enable the resonator to have two resonance modes at different excitation frequencies as a whole. When the two resonance modes are excited by a corresponding frequency, the driven member can move in two opposite directions, so that the driven member can present directional reciprocating translation motion.

In a possible implementation, a form of contact between the contact foot and the driven member includes line contact or surface contact.

For example, when the form of contact between the contact foot and the driven member is line contact, the first side wall and the second side wall are transitioned in an edge-angle manner. Alternatively, a surface of the contact foot that comes into contact with the driven member is an arc surface. When the form of contact between the contact foot and the driven member is surface contact, a surface of the contact foot that comes into contact with the driven member may be a plane. It should be understood that a shape of the contact foot is not limited to the shapes described above, and can meet a shape that comes into contact with and matches the driven member, which is not strictly limited in this embodiment.

In this way, a relatively small contact area can be used to enable the push portion to implement specific pre-pressure on the driven member, which helps increase rigidity of the push portion and eliminate displacement caused by a gap between the push portion and the driven member.

In a possible implementation, the resonator further includes a fastening portion connected to the main body portion. The fastening portion and the push portion are on different sides of the main body portion, and the fastening portion can fasten the resonator to an external structural member.

There are two fastening portions, and the two fastening portions are distributed on two sides of the first central axis.

Alternatively, there are a plurality of fastening portions, the plurality of fastening portions are distributed on two sides of the first central axis, and a quantity of fastening portions distributed on one side of the first central axis is consistent with a quantity of fastening portions distributed on the other side of the first central axis.

Alternatively, there are a plurality of fastening portions, the plurality of fastening portions are distributed on two sides of the first central axis, and a quantity of fastening portions distributed on one side of the first central axis is inconsistent with a quantity of fastening portions distributed on the other side of the first central axis.

It should be noted that a situation in which quantities of fastening portions on the two sides of the first central axis are inconsistent may include a situation in which the push portion is symmetrical with respect to the first central axis, or may include a situation in which the push portion is asymmetrical with respect to the first central axis. However, when the push portion is symmetrical with respect to the first central axis, a special asymmetrical form of the resonator in structure may also be implemented if a quantity of fastening portions on the two sides of the first central axis is asymmetrical. With the asymmetrical arrangement of the resonator in structure, the resonator has more diversified and variable structural forms, and may further be adjusted for a space size of a camera module to which the piezoelectric motor is applied, to achieve an objective of properly using space. In addition, the resonator can have two resonance modes at different excitation frequencies, so that the driven member performs a directional reciprocating translation motion.

In this way, a position of the resonator can be fastened by a connection relationship between the fastening portion and the external structural member, so that when the resonator vibrates, an entire position of the resonator cannot deviate due to being fastened by the fastening portion, thereby improving stability and reliability of normal operation of the resonator, and further ensuring motion precision of the driven member.

In a possible implementation, the main body portion further includes a second central axis, and the second central axis is perpendicular to the first central axis.

There is one push portion, and the one push portion is distributed on one side of the second central axis. One push portion is disposed and the push portion comes into contact with and matches the driven member, so that the push portion can smoothly drive the driven member to move, and further drive the optical structure fastened on the driven member to move together, to implement focusing or zooming of the camera module.

Alternatively, there are two push portions, and the two push portions are symmetrically distributed on two sides of the second central axis. This arrangement can make processing and manufacturing of the resonator relatively simple, and in addition, push actions of the two push portions can be synchronized and consistent, and reciprocating motion control precision of the driven member is relatively high, so that a relatively good motion effect of the driven member can be ensured in a process of driving the driven member to move.

In a possible implementation, the piezoelectric motor includes a stator and a driven member. The stator includes a vibration exciter that is always connected and the foregoing resonator. The resonator comes into contact with and matches the driven member and is configured to push the driven member to move relative to the stator.

It may be understood that the vibration exciter can be used as an excitation component to generate an excitation force, so that an excited object obtains a vibration amount of a specific form and magnitude. The resonator can generate vibration through excitation of the vibration exciter, and apply an action force to the driven member to drive the driven member to move.

For example, the vibration exciter is a piezoelectric element made of a piezoelectric material, and may be a piezoelectric element made of an inorganic piezoelectric material such as piezoelectric crystal or piezoelectric ceramic, or may be a piezoelectric element supported by an organic piezoelectric material such as polyvinylidene fluoride. The resonator may be a metallic matrix made of one or more metal materials, such as stainless steel or iron.

In a possible implementation, vibration generated by the vibration exciter in a power supply state can be amplified by the main body portion and transferred to the push portion, so that the push portion drives the driven member to move.

There is one vibration exciter, and the one vibration exciter is fastened to one side of two opposite sides of the main body portion.

Alternatively, there are two vibration exciters, and the two vibration exciters are respectively fastened to two opposite sides of the main body portion. A quantity of vibration exciters may be flexibly selected based on an actual situation, which is conducive to adapting to multi-scenario application requirements.

In a possible implementation, the piezoelectric motor further includes a driven member. The driven member comes into contact with and matches the push portion, and is configured to move relative to the push portion when driven by the push portion.

It may be understood that when no current is supplied to the vibration exciter (a current is zero or a current is very small), the vibration exciter is in an initial state. When a positive current is supplied to the vibration exciter, the vibration exciter extends and is in an elongated state. When a negative current is supplied to the vibration exciter, the vibration exciter shrinks and is in a shortened state. That is, the vibration exciter deforms based on an applied electrical signal. When the electrical signal is an alternating signal, the piezoelectric material periodically shrinks.

In this way, when a current at a specific frequency is supplied to the vibration exciter, the vibration exciter can generate elastic vibration, and amplify the vibration to the resonator through resonance, so that a part of the resonator that come into contact with the driven member forms an elliptical track motion, and relative friction occurs between the resonator and the driven member, to implement a driving function of the piezoelectric motor. The ellipse includes a special ellipse whose long radius is equal to a short radius, that is, a circle.

In a possible implementation, the resonator is configured to drive, when driven by the vibration exciter at a first frequency, the driven member to move in a first direction.

The resonator is further configured to drive, when driven by the vibration exciter at a second frequency, the driven member to move in a second direction, where the first direction is opposite to the second direction.

The first direction and the second direction may be understood as directions in which the driven member moves relative to the resonator, that is, the driven member can move toward two opposite directions relative to the resonator. For example, the driven member moving toward the first direction is moving leftward, then the driven member moving toward the second direction is moving rightward. When the piezoelectric motor is applied to the camera module, moving leftward and moving rightward may be understood as moving forward and moving backward in an optical axis direction parallel to the camera module.

It may be understood that the resonator has two resonance modes at different excitation frequencies as a whole. When the two resonance modes are excited by a corresponding frequency, the driven member can move in two opposite directions, so that the driven member can present a directional reciprocating translation motion.

For example, when an alternating signal at a frequency of 600 kHz is applied to the vibration exciter, the vibration exciter may push the driven member to move rightward. When an alternating signal at a frequency of 700 kHz is applied to the vibration exciter, the vibration exciter can push the driven member to move leftward.

In a possible implementation, the driven member includes contact portions and a matching portion, where the contact portions are bent and connected to the matching portion. The contact portions come into contact with the push portion, and apply an elastic abutting force to the push portion. A gap is formed between the matching portion and the stator, and the matching portion is configured to be always connected to the optical structure, to drive the optical structure to move.

In this way, the contact portion can provide a guide during movement of the driven member, so that the driven member can implement a translation motion when pushed by the push portion. The matching portion is bent and connected to the contact portion, so that only a part of the driven member that needs to come into contact with the push portion can abut against the push portion, and a part of the driven member that needs to be fastened to the optical structure is kept away from the push portion, which helps to properly use a spatial layout of the driven member and avoid mutual interference between the two parts due to function differences. An objective of being pushed by the push portion to move can be achieved, and the optical structure can be fastened, so that the optical structure can be driven to move together during movement, thereby implementing focusing or zooming of the camera module.

According to a second aspect, this disclosure provides a camera module. The camera module includes a base, an optical structure, and the foregoing piezoelectric motor. The resonator is fastened to the base, and the optical structure is fastened to the driven member, to move relative to the base when driven by the resonator.

According to a third aspect, this disclosure provides an electronic device. The electronic device includes a housing and the foregoing camera module. The camera module is accommodated in the housing.

DESCRIPTION OF EMBODIMENTS

For ease of understanding, terms in embodiments of this disclosure are first explained.

The term "and/or" describes only an association relationship for describing associated objects and represents that three relationships may exist. For example, a and/or b may represent the following three cases: Only a exists, both a and b exist, and only b exists.

"A plurality of" means "two or more".

"Fix" should be understood in a broad sense. For example, if a is fastened to b, a may be directly connected to b and a relative position after connection does not change, or a may be indirectly connected to b through an intermediate medium and a relative position after connection does not change.

The following clearly describes specific implementations of this disclosure with reference to the accompanying drawings.

Embodiments of this disclosure provide an electronic device. The electronic device may be, but is not limited to, a device such as a mobile phone, a tablet computer, an e-reader, a notebook computer, an in-vehicle device, a wearable device, or a wireless microwave receiving device.

For ease of understanding, a mobile phone, which is an electronic device with a wide use group and a rich application scenario, is used as an example for description. However, it should be understood that, this is not limited thereto.

Figure 1:
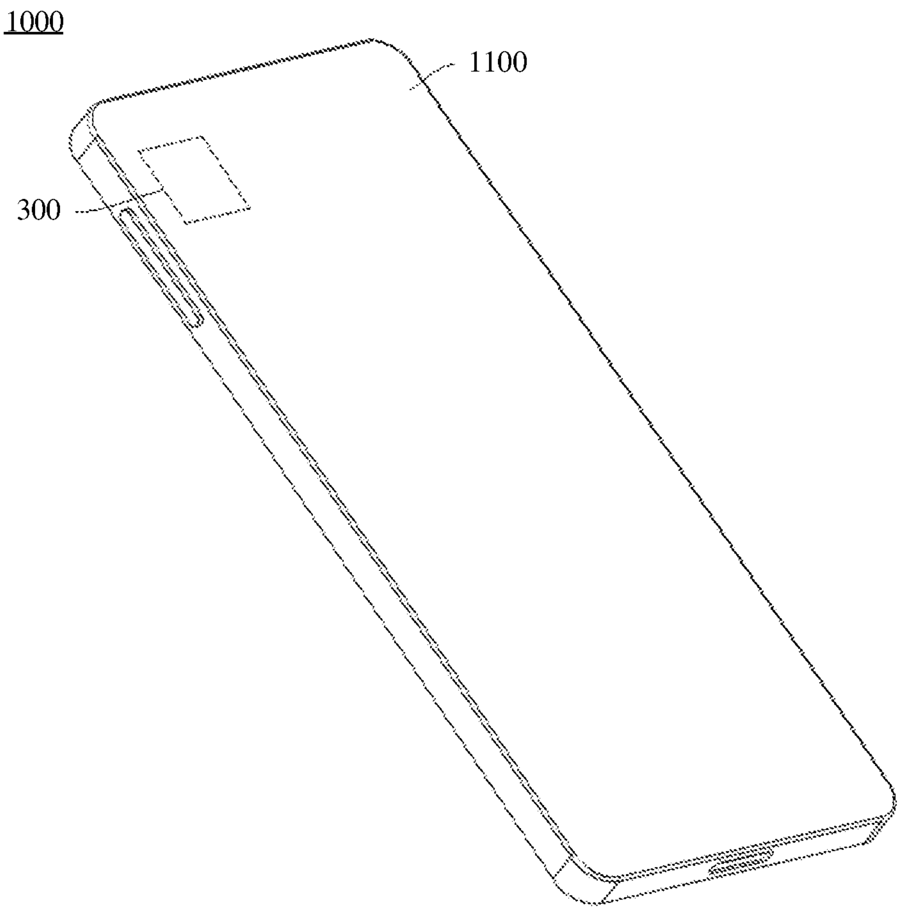
FIG. 1 is a simplified schematic diagram of an electronic device according to an embodiment of this disclosure.

Referring to FIG. 1, an electronic device 1000 includes a housing 1100 and a camera module 300 mounted on the housing 1100. The housing 1100 can accommodate a component of the electronic device 1000 and provide a protection function for the component, to effectively avoid a situation in which the component of the electronic device 1000 is damaged due to external mechanical damage. The entire camera module 300 is accommodated inside the housing 1100, or most of the camera module 300 is accommodated inside the housing 1100. The camera module 300 can enable the electronic device 1000 to implement one or more functions in collecting an image in real time, making an instant video call, or obtaining three-dimensional information of a to-be-measured object. The camera module 300 may be used as a front camera to capture a static image or a dynamic video in front of the electronic device 1000, or may be used as a rear camera to capture a static image or a dynamic video in rear of the electronic device 1000.

It may be understood that the camera module 300 can have a focusing function and a zooming function. Focusing may be understood as a process in which an object can be clearly imaged on a photosensitive element by adjusting a distance between an imaging plane and a lens, and a photographed object is clearly imaged. Zooming may be understood as a process in which an angle of view or an image size is changed by changing a combination of a plurality of lens groups, to obtain a zoom-in or zoom-out effect. Generally, a longer focal length indicates a narrower angle of view, fewer scenes can be accommodated in a picture, and the picture looks closer. A shorter focal length indicates a broader angle of view, more scenes can be accommodated in a picture, and the picture looks farther.

It should be noted that an objective of FIG. 1 is merely to schematically describe a connection relationship between the housing 1100 and the camera module 300, but is not to specifically limit a connection position, a specific structure, or a quantity of devices. A structure shown in this embodiment of this disclosure does not constitute a specific limitation on the electronic device 1000. In some other embodiments of this disclosure, the electronic device 1000 may include more or fewer components than those shown in the figure, some components may be combined, some components may be split, or different component arrangements may be used. The components shown in the figure may be implemented through hardware, software, or a combination of software and hardware.

Figure 2:
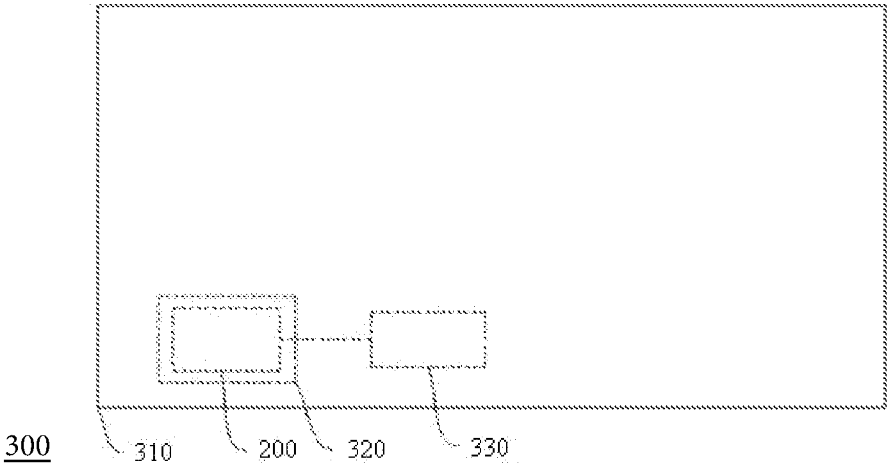
FIG. 2 is a simplified schematic diagram of a camera module according to an embodiment of this disclosure.

Referring to FIG. 2, the camera module 300 may include a base 310, an optical structure 320, a circuit board 330, and a piezoelectric motor 200. The base 310 may be understood as a supporting component that can accommodate various components that form the camera module 300, and can directly or indirectly carry various components. The optical structure 320 may be understood as a structural member that can implement a focusing or zooming function of the camera module 300, that is, may be an independent optical structural member, for example, an optical lens, or may be an integrated structure or an assembled structure formed by assembling a plurality of optical structural members, for example, a lens group or a lens. The circuit board 330 can be electrically connected to the piezoelectric motor 200 to provide an electrical signal for the piezoelectric motor 200, and can also be communicatively connected to a processor of the electronic device 1000. The circuit board 330 may be disposed at a corresponding position in the camera module 300 based on a requirement, for example, an inner side wall of the base 310. The piezoelectric motor 200 may be understood as an actuating component that implements driving through a piezoelectric drive technology, and can provide an actuating force, so that the optical structure 320 performs a directional translation motion, thereby implementing a better photographing effect. For example, the piezoelectric motor 200 may be an ultrasonic piezoelectric motor 200 (USM) whose resonance frequency is greater than 20 kHz.

The piezoelectric drive technology enables, based on a converse piezoelectric effect of a piezoelectric material by controlling an electrical signal applied to the piezoelectric material, the piezoelectric material to generate mechanical deformation, to use the deformation to push another component of the piezoelectric motor 200 to move, thereby driving the optical structure 320 to move. The converse piezoelectric effect refers to that an electric field is applied in a polarization direction of a dielectric, and the dielectric generates mechanical deformation or mechanical pressure in a specific direction. When the applied electric field is removed, the deformation or stress disappears.

It should be noted that FIG. 2 is merely an example of a connection relationship between the base 310, the optical structure 320, the circuit board 330, and the piezoelectric motor 200, and does not specifically limit a connection position, a specific structure, or a quantity of devices. The structure shown in this embodiment of this disclosure does not constitute a specific limitation on the camera module 300.

For example, when the optical structure 320 is a lens group, the optical structure 320 may be correspondingly connected to the piezoelectric motor 200 in a one-to-one manner. Therefore, when there are a plurality of optical structures 320, there may also be a plurality of piezoelectric motors 200. The plurality of optical structures 320 may be driven by the plurality of piezoelectric motors 200 to implement relative motion, and the relative motion may be understood as being close to each other or relatively away from each other. In this way, a focal length and an image can be adjusted based on a requirement of an application scenario by adjusting a relative position between the plurality of optical structures 320, to obtain a high-quality imaging effect.

With reference to the foregoing description, because the piezoelectric motor 200 adopts piezoelectric drive instead of magnetic drive, there is no strong magnetic component inside the piezoelectric motor 200. A possibility of generating magnetic interference to a component disposed around the piezoelectric motor 200 can be minimized, and an electromagnetic interference problem of a conventional motor can be effectively resolved. In addition, because the piezoelectric motor 200 has advantages such as low power consumption, a simple structure, high location resolution, quick response, power-off self-locking, and low noise, photographing quality of the camera module 300 and the electronic device 1000 to which the camera module 300 is applied can be better.

With reference to FIG. 2 to FIG. 10, a specific structure and a driving principle of the piezoelectric motor 200 are fully described below in detail.

Figure 3:
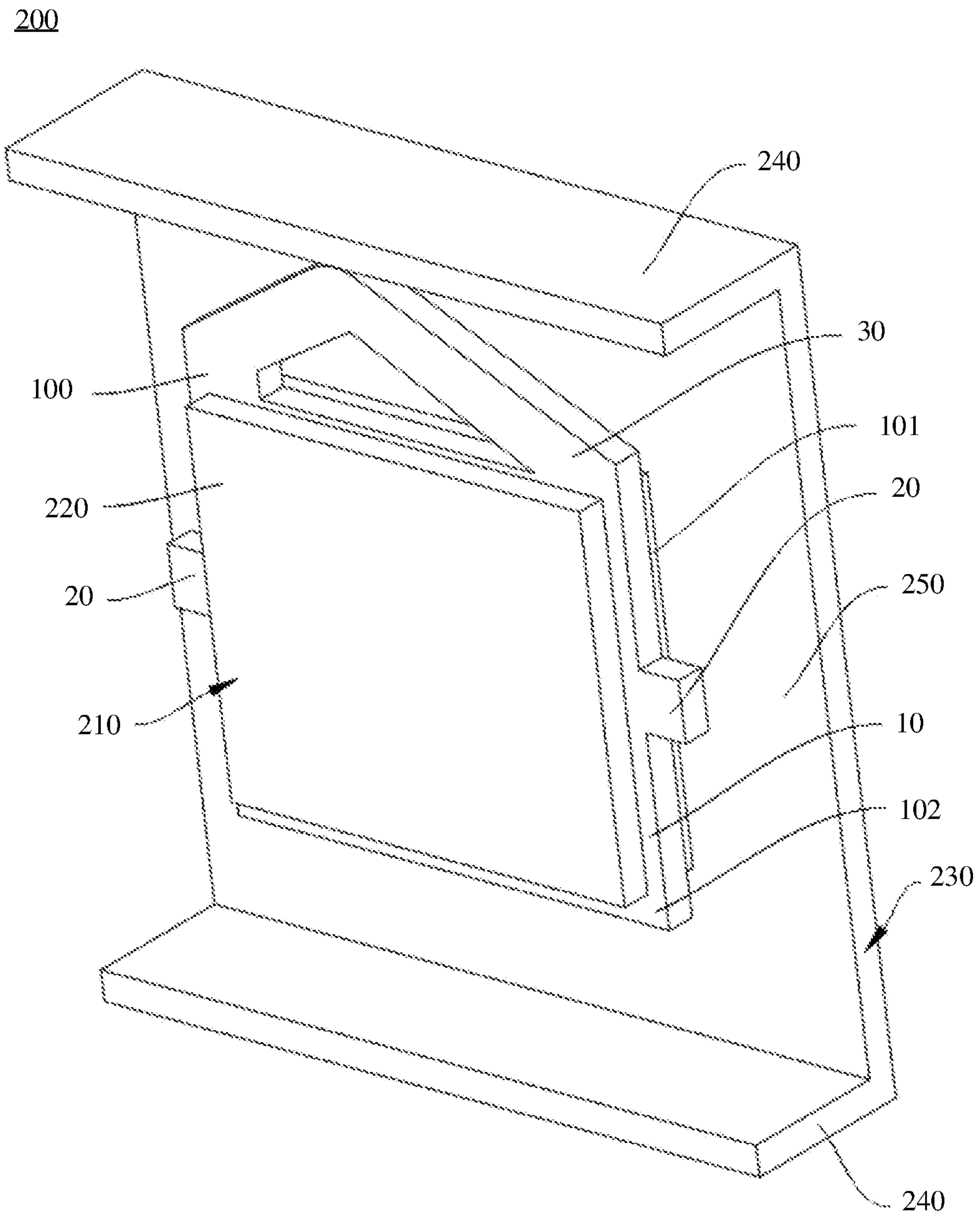
FIG. 3 is a schematic diagram of a structure of a piezoelectric motor according to an embodiment of this disclosure.
Figure 4:
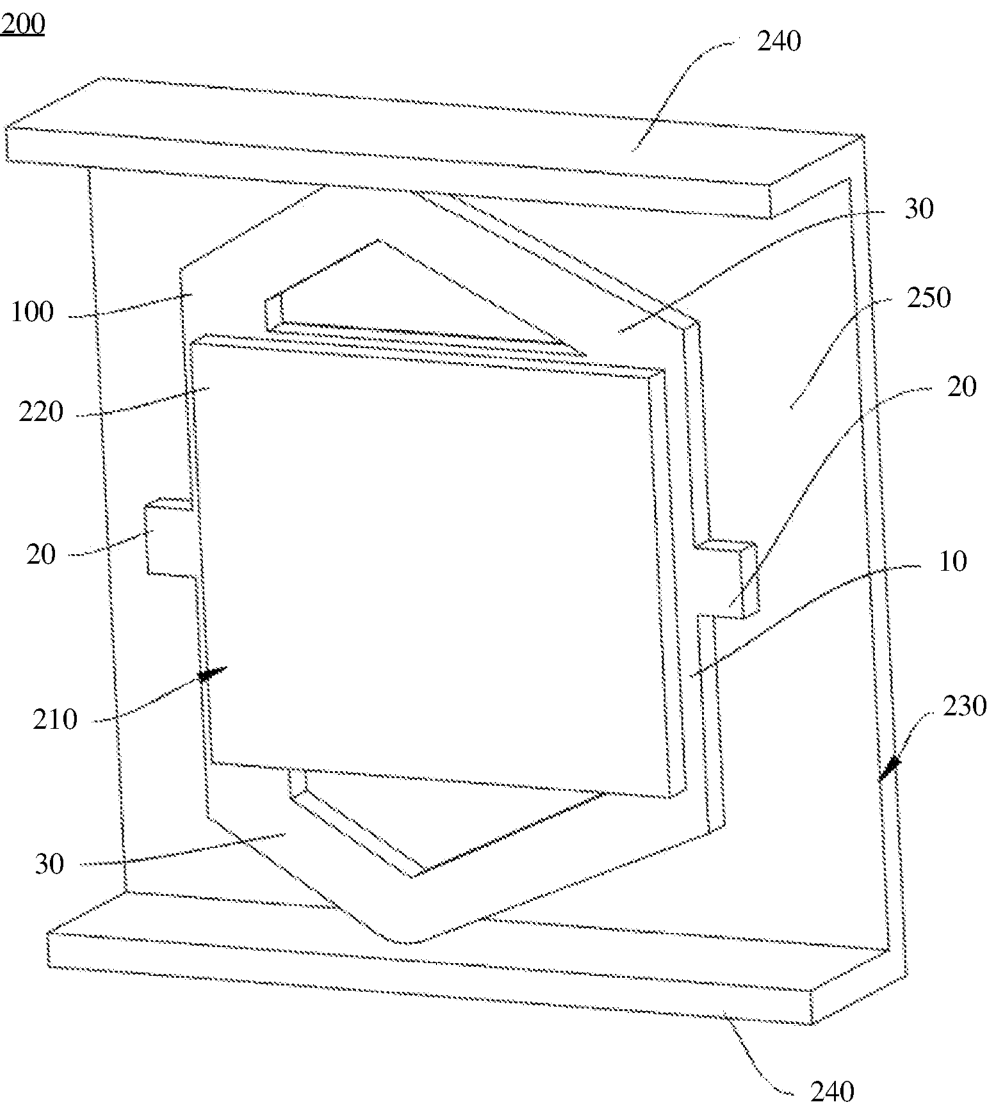
FIG. 4 is another schematic diagram of a structure of a piezoelectric motor according to an embodiment of this disclosure.

Referring to FIG. 3 and FIG. 4, the piezoelectric motor 200 includes a stator 210 and a driven member 230. The stator 210 may be understood as a part whose position is fastened in the piezoelectric motor 200. After an electrical signal is inputted, the stator 210 may generate vibration and drive the driven member 230 to move. The driven member 230 may be understood as a part whose position can change in the piezoelectric motor 200. The driven member 230 may implement translation motion. That is, the piezoelectric motor 200 is a transmission apparatus that can convert inherent vibration (resonance) generated by the stator 210 into translation motion of the driven member 230.

In a possible implementation, the stator 210 is fastened to the base 310, the optical structure 320 is fastened to the driven member 230, and the driven member 230 can drive, when driven by the stator 210, the optical structure 320 to move relative to the base 310. In this way, the optical structure 320 can implement directional translation motion together through directional translation motion of the driven member 230, thereby implementing focusing or zooming of the camera module 300.

Figure 5:
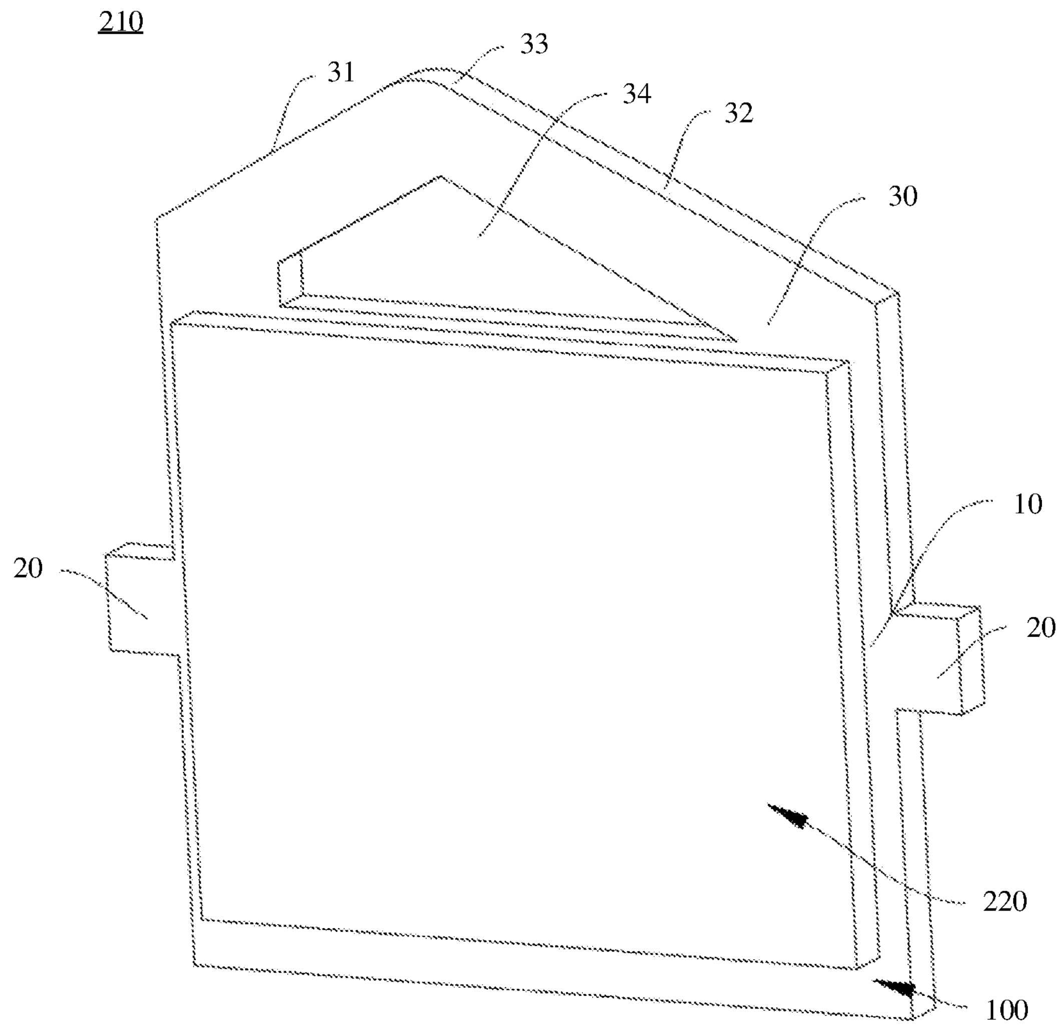
FIG. 5 is a schematic diagram of a structure of a stator of a piezoelectric motor according to an embodiment of this disclosure.
Figure 6:
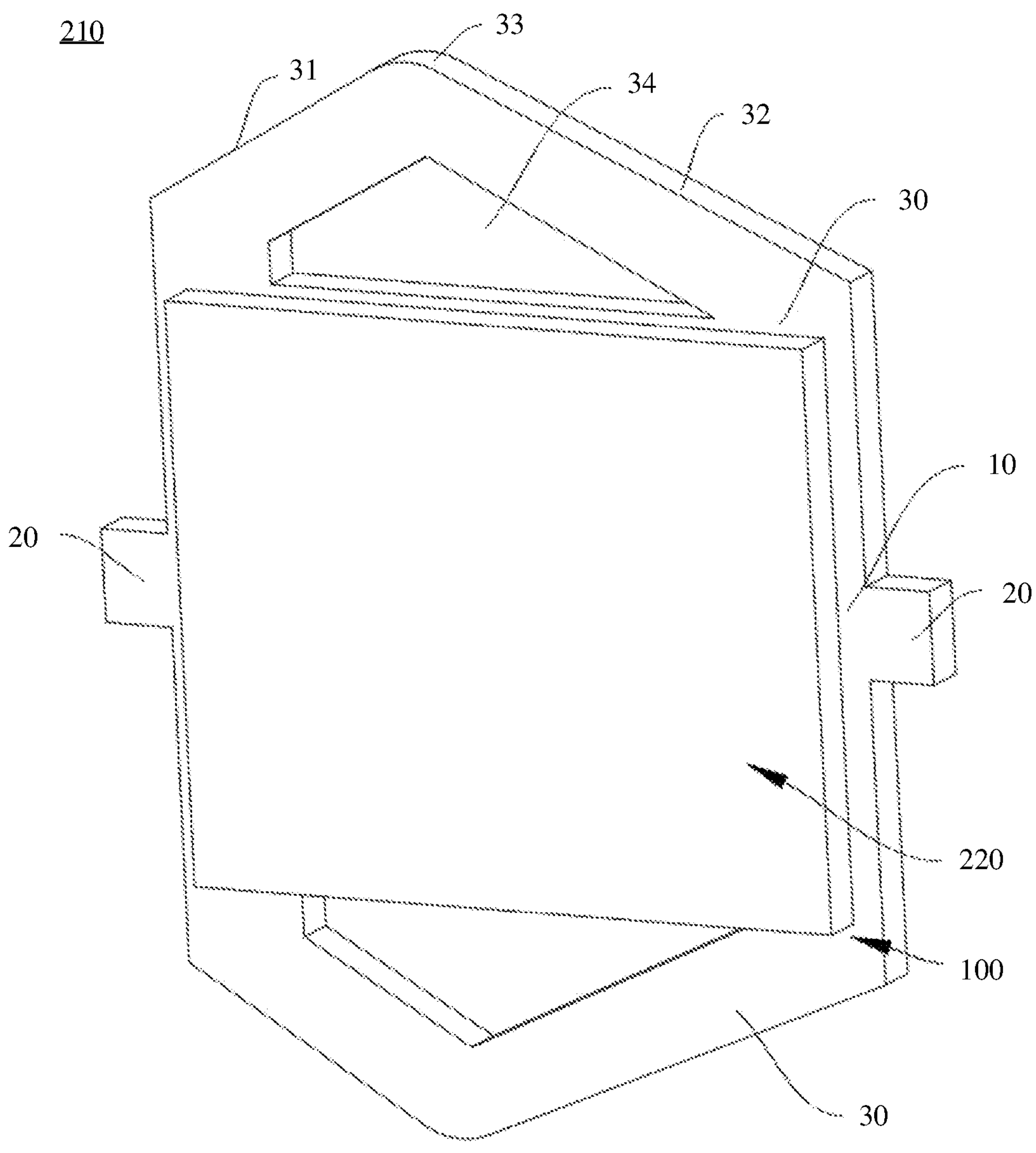
FIG. 6 is another schematic diagram of a structure of a stator of a piezoelectric motor according to an embodiment of this disclosure.
Figure 7:
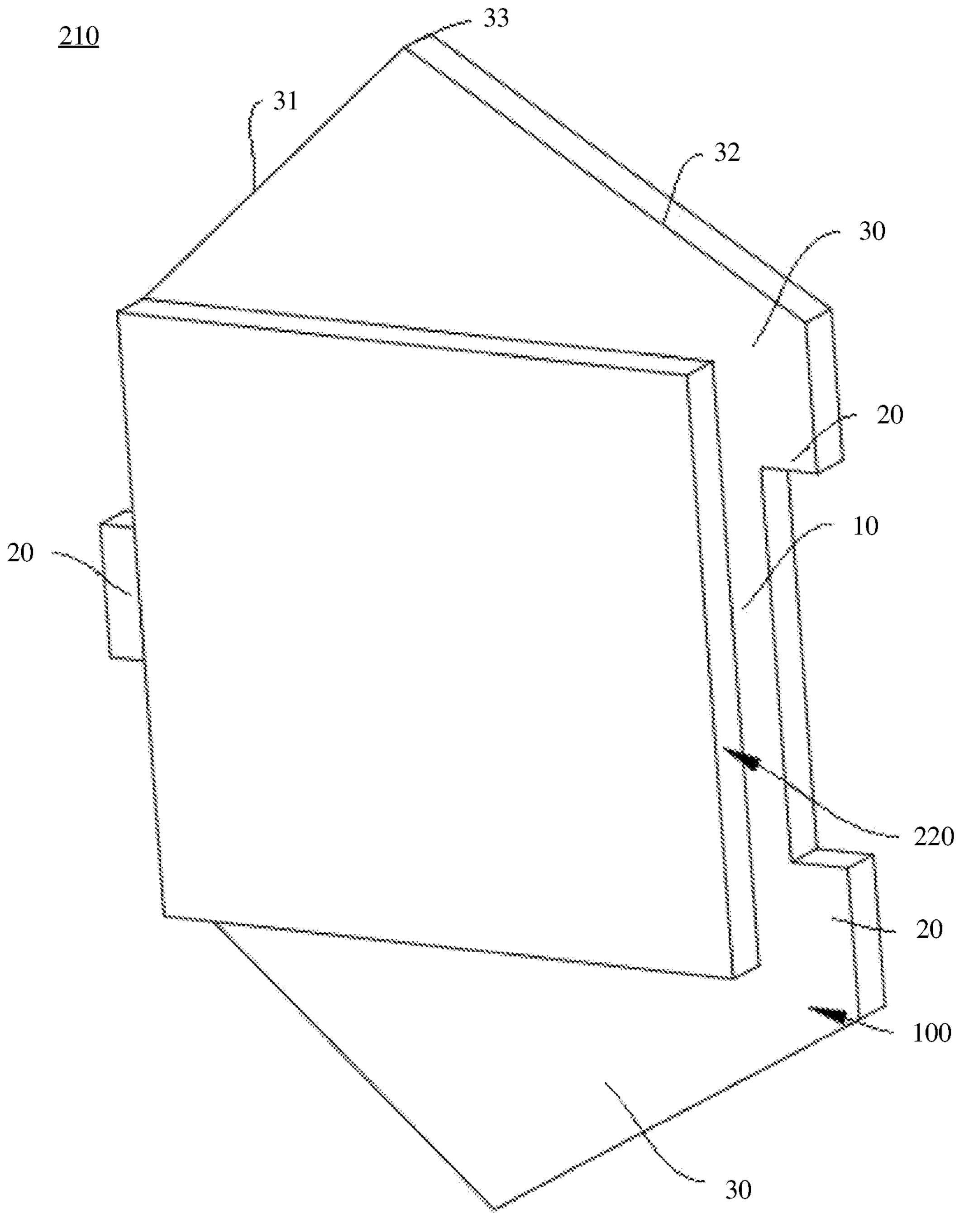
FIG. 7 is still another schematic diagram of a structure of a stator of a piezoelectric motor according to an embodiment of this disclosure.

Referring to FIG. 5, FIG. 6, and FIG. 7, the stator 210 includes a vibration exciter 220 and a resonator 100 that are always connected. The vibration exciter 220 can be used as an excitation component to generate an excitation force, so that an excited object obtains a vibration amount of a specific form and magnitude. The resonator 100 can generate vibration through excitation of the vibration exciter 220, and apply an action force to the driven member 230, to drive the driven member 230 to move.

For example, the vibration exciter 220 is a piezoelectric element made of a piezoelectric material, and may be a piezoelectric element made of an inorganic piezoelectric material such as piezoelectric crystal or piezoelectric ceramic, or may be a piezoelectric element supported by an organic piezoelectric material such as polyvinylidene fluoride. The resonator 100 may be a metallic matrix made of one or more metal materials, such as stainless steel or iron.

Figure 8:
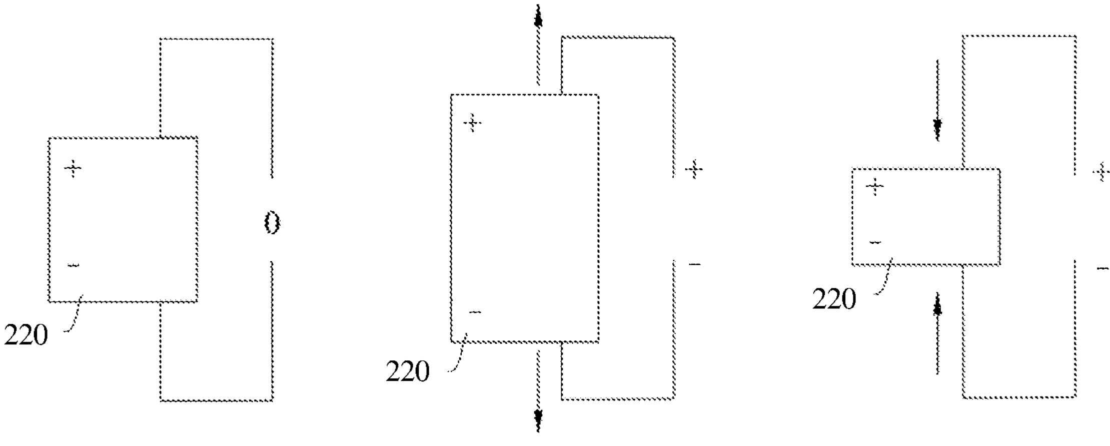
FIG. 8 is a schematic diagram of a converse piezoelectric effect of a vibration exciter of a piezoelectric motor according to an embodiment of this disclosure.

Referring to FIG. 8, when no current is supplied to the vibration exciter 220 (a current is zero or a current is very small), the vibration exciter 220 is in an initial state. When a positive current is supplied to the vibration exciter 220, the vibration exciter 220 extends and is in an elongated state. When a negative current is supplied to the vibration exciter 220, the vibration exciter 220 shrinks and is in a shortened state. That is, the vibration exciter 220 deforms based on an applied electrical signal. When the electrical signal is an alternating signal, the piezoelectric material periodically shrinks.

In this way, when a current at a specific frequency is supplied to the vibration exciter 220, the vibration exciter 220 can generate elastic vibration, and amplify the vibration to the resonator 100 through resonance, so that a part of the resonator 100 that comes into contact with the driven member 230 forms an elliptical track motion, and relative friction occurs between the resonator 100 and the driven member 230, to implement a driving function of the piezoelectric motor 200.

Figure 9:
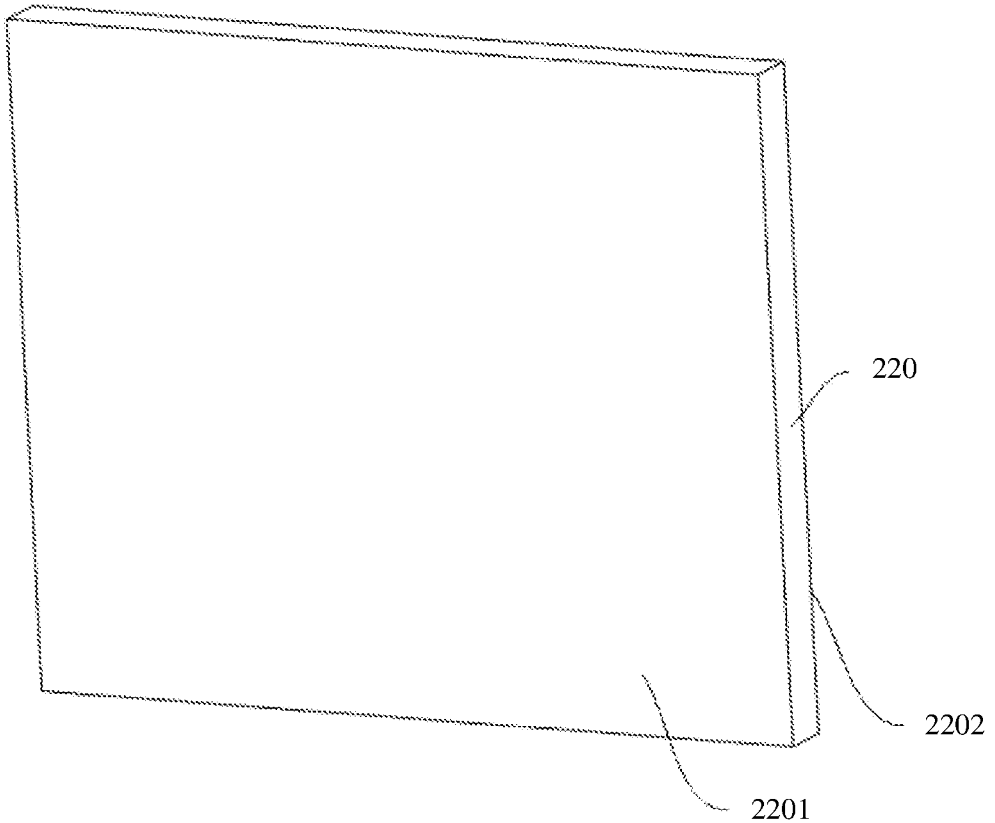
FIG. 9 is a schematic diagram of a structure of a vibration exciter of a piezoelectric motor according to an embodiment of this disclosure.
Figure 10:
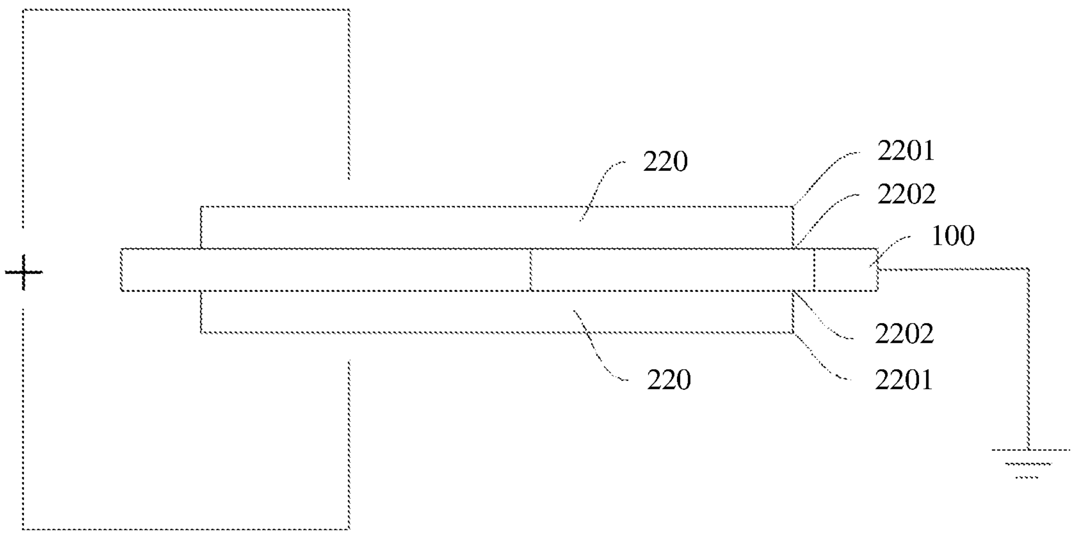
FIG. 10 is a simplified schematic diagram of a drive circuit of a piezoelectric motor according to an embodiment of this disclosure.

Referring to FIG. 5 and FIG. 9, the vibration exciter 220 includes a front surface 2201 and a rear surface 2202. The front surface 2201 of the vibration exciter 220 may be understood as a surface that is of the vibration exciter 220 and that is away from the resonator 100, and the rear surface 2202 of the vibration exciter 220 may be understood as a surface that is of the vibration exciter 220 and that comes into contact with the resonator 100. The front surface 2201 of the vibration exciter 220 may be electrically connected to the circuit board 330, so that the circuit board 330 can send a drive signal for driving the vibration exciter 220 to the vibration exciter 220. The rear surface 2202 of the vibration exciter 220 is fastened to the resonator 100, so that the vibration exciter 220 is always connected to the resonator 100. For example, the rear surface 2202 of the vibration exciter 220 may be connected to the resonator 100 by a conductive adhesive.

In this way, the resonator 100 can provide a strong support function for the vibration exciter 220, that is, the vibration exciter 220 can enhance fastened-position stability of the vibration exciter 220 through a connection relationship with the resonator 100. A reliability requirement of a drop test of the vibration exciter 220 can be met, and a capability of the vibration exciter 220 to resist an accidental impact is effectively enhanced. In addition, in actual application of the vibration exciter 220, a possibility of damage caused by falling of the vibration exciter 220 can be effectively minimized, and connection reliability is high.

Both the front surface 2201 and the rear surface 2202 of the vibration exciter 220 may be plated with a conductive material, so that the vibration exciter 220 can be connected to an external electrode for use. Specifically, the resonator 100 may be grounded, and the vibration exciter 220 is always connected to the resonator 100. Therefore, the front surface 2201 of the vibration exciter 220 may be connected to a positive electrode, and the rear surface 2202 of the vibration exciter 220 may be grounded, so that the piezoelectric motor 200 may form a connection circuit shown in FIG. 10 as a whole. Certainly, the resonator 100 may alternatively be connected to a positive electrode, so that the front surface 2201 of the vibration exciter 220 may be grounded, and the rear surface 2202 of the vibration exciter 220 may be connected to a positive electrode. This is not strictly limited in this embodiment of this disclosure.

For example, the vibration exciter 220 may be rectangular, circular, or polygonal. The conductive material may be a material such as gold or silver. A shape of the vibration exciter 220 and a conductive material plated on a surface of the vibration exciter 220 are not strictly limited in this embodiment of this disclosure.

In a possible implementation, the piezoelectric motor 200 further includes a drive circuit. The drive circuit may be formed on the circuit board 330 or fastened and electrically connected to the circuit board 330. When the drive circuit is formed on the circuit board 330, the drive circuit may include a cable on the circuit board 330 and one or more components fastened on the circuit board 330. The components may be, but are not limited to, a resistor, a capacitor, an inductor, and the like. When the drive circuit is fastened and electrically connected to the circuit board 330, the drive circuit may be represented as a chip structure or a circuit component including the circuit board 330 and a component. Certainly, the drive circuit may alternatively be integrated into a processor of the electronic device 1000.

It may be understood that the drive circuit can form a drive signal for driving the vibration exciter 220, and implement grounding of the resonator 100. For example, the vibration exciter 220 may be electrically connected to the drive circuit through one conduction member, to form a link that can transmit a drive signal for the vibration exciter 220. The resonator 100 may be electrically connected to the drive circuit through another conduction member, to form a link that can implement grounding of the resonator 100.

In a possible implementation, there may be one vibration exciter 220, and the one vibration exciter 220 is fastened to any one of two sides that are disposed opposite to each other of the resonator 100. That is, the vibration exciter 220 is disposed on one side. The vibration exciter 220 disposed on one side can excite the resonator 100 to generate resonance.

In another possible implementation, there may be two vibration exciters 220, and the two vibration exciters 220 are respectively fastened to two sides that are disposed opposite to each other of the resonator 100. That is, the vibration exciters 220 are disposed on the two sides. The vibration exciters 220 disposed on two sides have good stability, and can further ensure that the vibration exciters 220 can excite the resonator 100 to generate resonance, and have high reliability.

It should be noted that when there are two vibration exciters 220, the two vibration exciters 220 need to be excited by electrical signals at a same frequency, to ensure that the resonator 100 can stably generate resonance. In addition, there may be a plurality of vibration exciters 220. The plurality of vibration exciters 220 may be configured on two sides of the resonator 100 in a same quantity, or the plurality of vibration exciters 220 may be configured on two sides of the resonator 100 in a different quantity, provided that the vibration exciters 220 are excited by alternating signals at a same frequency. The quantity of vibration exciters 220 is not strictly limited in this embodiment of this disclosure.

Based on the foregoing description, it should be understood that the vibration exciter 220 can generate periodic mechanical deformation after being excited by an alternating signal at a specific frequency, so that the resonator 100 connected to the vibration exciter 220 can generate resonance, and a special vibration form is formed between the vibration exciter 220 and the resonator 100, and the resonator 100 is enabled to push the driven member 230 to move.

A structure of the vibration exciter 220 is described above in detail, and a structure of the resonator 100 is described below in detail with reference to FIG. 11 to FIG. 21.

Figure 11:
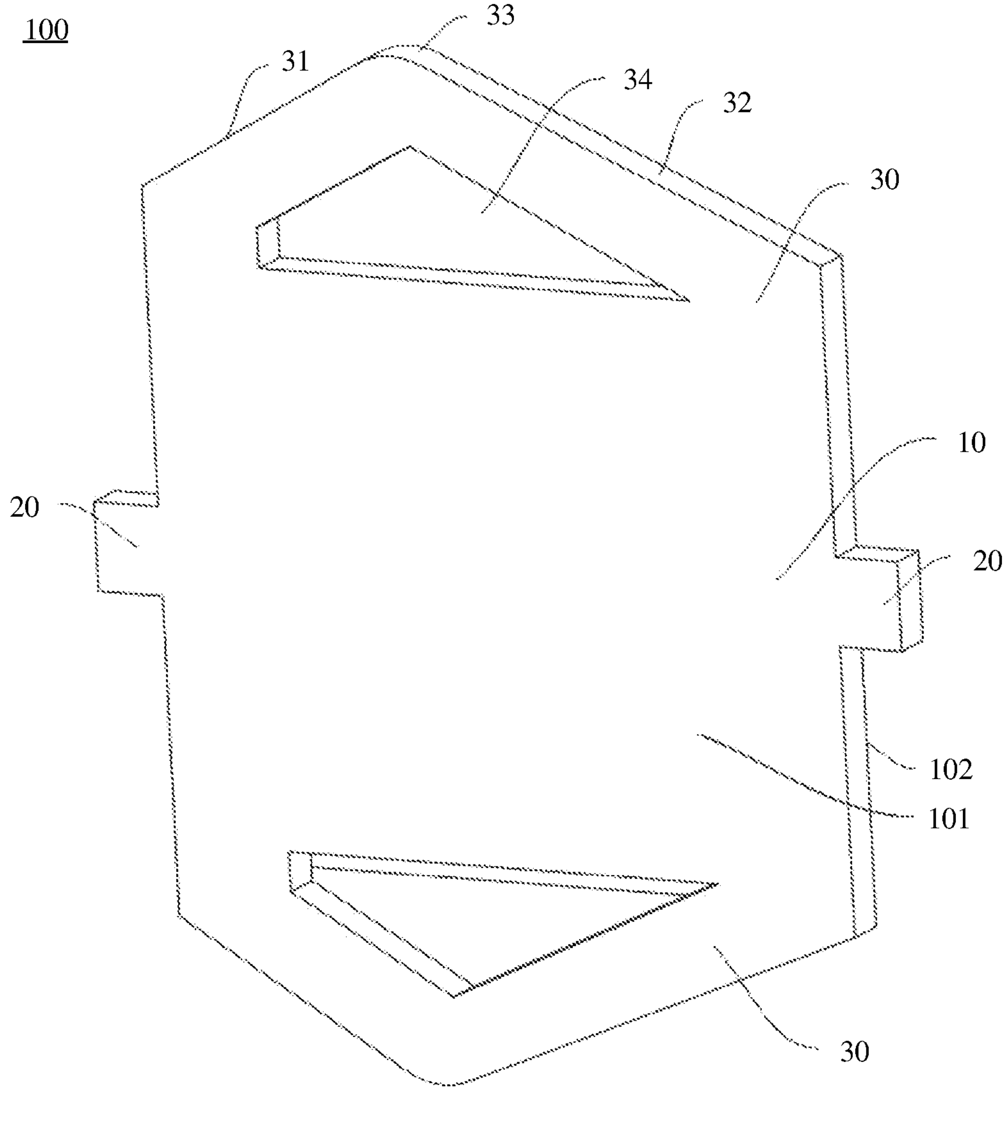
FIG. 11 is a schematic diagram of a structure of a resonator according to Embodiment 1 of this disclosure.
Figure 12:
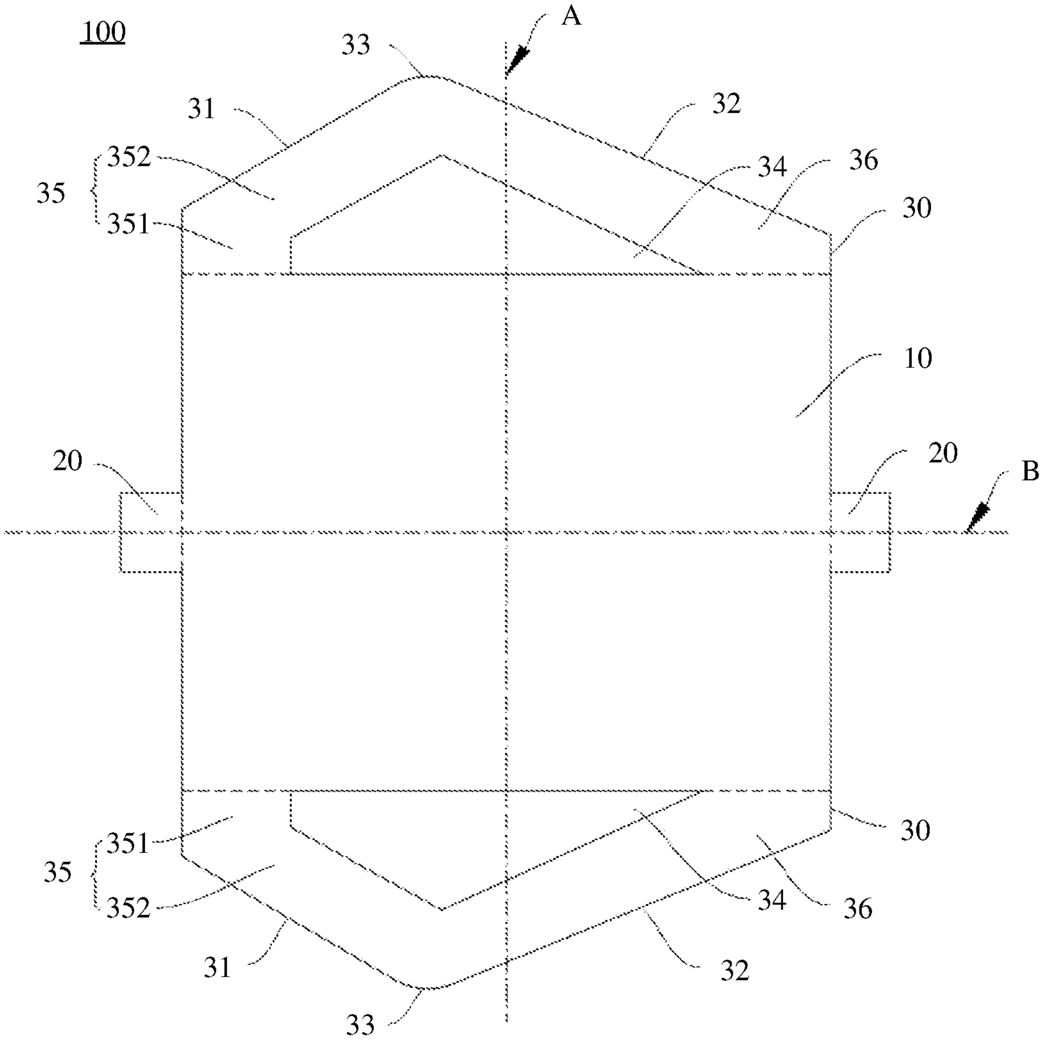
FIG. 12 is a schematic diagram of a structure of a resonator in Solution 2 of a push portion of a resonator according to Embodiment 1 of this disclosure.

Referring to FIG. 11 and FIG. 12, the resonator 100 includes a main body portion 10, a fastening portion 20, and a push portion 30. The main body portion 10 is a part that can provide a relatively large contact area in the resonator 100 to fasten the vibration exciter 220. The fastening portion 20 is a part that is in the resonator 100 and that can be fastened to an external structural member to fasten a position of the resonator 100. The push portion 30 is a part that is in the resonator 100 and that can come into contact with and match the driven member 230 to drive the driven member 230 to move.

The main body portion 10 includes a first surface 101 and a second surface 102 that are disposed opposite to each other. The first surface 101 may be fastened to the vibration exciter 220, and the second surface 102 may also be fastened to the vibration exciter 220. Therefore, when there are two or more vibration exciters 220, the vibration exciter 220 may be disposed on the first surface 101 and the second surface 102 of the main body portion 10, which helps improve stability of an overall structure of the piezoelectric motor 200.

It may be understood that the main body portion 10 comes into contact with and matches the vibration exciter 220, that is, the main body portion 10 can directly contact the vibration exciter 220. Therefore, when the vibration exciter 220 is excited by an alternating signal at a specific frequency, periodic mechanical deformation can be generated, which may also be referred to as periodic elastic vibration. The vibration can be amplified to the main body portion through resonance, that is, can be amplified to the resonator 100, so that the resonator 100 drives the driven member 230 to move. The specific frequency may be understood as a frequency that can enable the resonator 100 to generate resonance.

In this embodiment of this disclosure, the main body portion 10 has a first central axis A and a second central axis B. The first central axis A and the second central axis B are perpendicular to each other, and an intersection point of the first central axis A and the second central axis B is located on a center line of the main body portion 10.

It may be understood that, from an angle of view of the first central axis A, the main body portion 10 is distributed on the two sides of the first central axis A, and the main body portion may be of a symmetrical structure with respect to the first central axis A, or may be of an asymmetrical structure with respect to the first central axis A (for example, the main body portion has an irregular edge). However, from an angle of view of the second central axis B, the main body portion 10 is distributed on the two sides of the second central axis B. It should be understood that the main body portion 10 may alternatively be of a symmetrical structure with respect to the second central axis B, that is, the main body portion 10 may be symmetrical with respect to both the first central axis A and the second central axis B. This is not strictly limited in this embodiment of this disclosure. For example, the main body portion 10 may be rectangular.

Referring to FIG. 12 to FIG. 21, the fastening portion 20 is connected to the main body portion 10, and the fastening portion 20 can fasten the resonator 100 to the external structural member. That is, the fastening portion 20 can fasten the stator 210 to the external structural member. When the piezoelectric motor 200 is applied to the camera module 300, the external structural member may be a side wall of the base 310 of the camera module 300, or may be another static component in the camera module 300. This is not strictly limited in this embodiment of this disclosure.

In this way, a position of the fastening portion 20 is fastened, that is, a position of the resonator 100 can be fastened by a connection relationship between the fastening portion 20 and the external structural member, so that when the resonator 100 vibrates, an entire position of the resonator 100 cannot deviate due to being fastened by the fastening portion 20, thereby improving stability and reliability of normal operation of the resonator 100, and further ensuring motion precision of the driven member 230.

It may be understood that there are at least two fastening portions 20, and the at least two fastening portions 20 are distributed on the two sides of the first central axis A and are connected to the main body portion 10.

For example, there may be two fastening portions 20, and the two fastening portions 20 are distributed on the two sides of the first central axis A. Alternatively, there may be three fastening portions 20, one fastening portion 20 is distributed on one side of the first central axis A, and the other two fastening portions 20 are distributed on the other side of the second central axis B and are spaced apart. Alternatively, there may be a plurality of fastening portions 20, the plurality of fastening portions 20 are distributed on the two sides of the first central axis A, and a quantity of fastening portions 20 distributed on one side of the first central axis A is consistent with a quantity of fastening portions 20 distributed on the other side of the first central axis A. Alternatively, there may be a plurality of fastening portions 20, the plurality of fastening portions 20 are distributed on the two sides of the first central axis A, and a quantity of fastening portions 20 distributed on one side of the first central axis A is inconsistent with a quantity of fastening portions 20 distributed on the other side of the first central axis A.

It should be noted that, a shape of the fastening portion 20 may be a rectangle, an arc, a polygon, or the like. A connection position of the fastening portion 20 may be an intermediate position of one side of the main body portion 10, or may be a position at two ends of one side of the main body portion 10. The fastening portion 20 may be disposed at an interval with the push portion 30, or may be connected to the push portion 30, provided that the fastening portion 20 implements a fastening function and is distributed on a different side of the main body portion 10 from the push portion 30. A quantity, a shape, and a connection position of the fastening portion 20 are not strictly limited in this embodiment.

The push portion 30 is connected to the main body portion 10 and distributed on the two sides of the first central axis A, the push portion 30 and the fastening portion 20 are located on different sides of the main body portion 10, and the push portion 30 comes into contact with and matches the driven member 230. It should be understood that, because the push portion 30 and the fastening portion 20 have function differences, the push portion 30 and the fastening portion 20 are respectively arranged on different sides of the main body portion 10, and can be arranged in different regions of the main body portion 10 based on different functions, so as to minimize a possibility that an effect of the piezoelectric motor 200 is reduced due to interference between the two portions.

Referring to FIG. 5, in a possible implementation, there may be one push portion 30, and the one push portion 30 is distributed on one side of the second central axis B. In other words, from an angle of view of the first central axis A, the push portion 30 is distributed on the two sides of the first central axis A, and from an angle of view of the second central axis B, one push portion 30 is distributed on one side of the second central axis B, that is, the one push portion 30 is connected to any one of the two opposite sides of the main body portion 10. One push portion 30 is disposed and the push portion 30 comes into contact with and matches the driven member 230, so that the push portion 30 can smoothly drive the driven member 230 to move, thereby driving the optical structure 320 fastened on the driven member 230 to move together, to implement focusing or zooming of the camera module 300.

Referring to FIG. 6, in another possible implementation, there are two push portions 30, and the two push portions 30 are symmetrically distributed on two sides of the second central axis B. In other words, from an angle of view of the first central axis A, each of the two push portions 30 is distributed on the two sides of the first central axis A, and from an angle of view of the second central axis B, the two push portions 30 are symmetrically disposed with respect to the second central axis B. That is, the two push portions 30 are respectively connected to two opposite sides of the main body portion 10, and the two push portions 30 have a same structure. This arrangement can make processing and manufacturing of the resonator 100 relatively simple, and in addition, push actions of the two push portions 30 can be synchronized and consistent, and reciprocating motion control precision of the driven member 230 is relatively high, so that a relatively good motion effect of the driven member 230 can be ensured in a process of driving the driven member 230 to move.

Based on the foregoing description, it should be understood that a quantity of the push portions 30 may be selected based on an actual application situation, provided that the push portion 30 can be connected to the main body portion 10 and can push the driven member 230 to move relative to the stator 210. A quantity of the push portions 30 is not strictly limited in this embodiment of this disclosure.

Referring to FIG. 12 to FIG. 21, the push portion 30 has a symmetrical or asymmetrical structure with respect to the first central axis A. That is, a part that is of the push portion 30 and that is located on one side of the first central axis A is symmetrically or asymmetrically disposed with a part that is of the push portion 30 and that is located on the other side of the first central axis A. The push portion 30 can further come into contact with and match the driven member 230, and push the driven member 230 to move when excited by the vibration exciter 220. That the push portion 30 is asymmetrically disposed with respect to the first central axis A is described below in detail.

It may be understood that the elastic vibration generated by the vibration exciter 220 can be amplified to the main body portion 10 through resonance, and the main body portion 10 is connected to the push portion 30. Therefore, the vibration can be transferred to the push portion 30, so that the push portion 30 can move along the elliptical track, thereby driving the driven member 230 to move relative to the push portion 30. With the asymmetrical arrangement of the push portion 30 in structure, the push portion 30 has more diversified and variable structural forms, and may further be adjusted for a space size of a camera module 300 to which the piezoelectric motor 200 is applied, to achieve an objective of properly using space. In addition, the resonator 100 can have two resonance modes at different excitation frequencies, so that the driven member 230 performs a directional reciprocating translation motion.

In other words, the resonator 100 can generate two resonance modes when excited by the vibration exciter 220. That is, the push portion 30 can generate two resonance modes when excited by the vibration exciter 220. The two resonance modes have different excitation frequencies, and opposite vibration forms. Specifically, when excitation of alternating signals at different frequencies is applied to the push portion 30, the two resonance modes can push the driven member 230 to move toward two opposite directions, thereby implementing the reciprocating translation motion of the driven member 230. In addition, because the position of the push portion 30 is fastened and does not change, it may be understood that when driven by vibration of the push portion 30 at an original position, the driven member 230 can be driven by a pushing force to move relative to the push portion 30, that is, the driven member 230 can move relative to the stator 210.

Therefore, because the piezoelectric motor 200 adopts piezoelectric drive instead of magnetic drive, there is no strong magnetic component inside the piezoelectric motor 200, and there is no magnetic interference characteristic for a peripheral component. Therefore, product competitiveness of the camera module 300 and the electronic device 1000 to which the piezoelectric motor 200 is applied can be improved. In addition, the resonator 100 can implement directional translation motion of the driven member 230 with a relatively simple and easy-to-manufacture structure, so that when the optical structure 320 is fastened on the driven member 230, the optical structure 320 can be driven to implement directional translation together, to implement a better optical effect.

Referring to FIG. 11 to FIG. 21, the push portion 30 includes a first side wall 31 and a second side wall 32, a contact foot 33 configured to come into contact with and match the driven member 230 is formed at a junction between the first side wall 31 and the second side wall 32, and the first side wall 31 and the second side wall 32 are arranged at an angle. It should be understood that the first side wall 31 and the second side wall 32 can form an appearance structure of the push portion 30, and the first side wall 31 and the second side wall 32 are arranged at an angle, that is, the first side wall 31 and the second side wall 32 are not coplanar.

In this way, a top contour of the push portion 30 can be presented as a triangle, and a top of the push portion 30 may be understood as a part that is of the push portion 30 and that is away from the main body portion 10. This arrangement is conducive to miniaturization of the entire resonator 100, and can make the push portion 30 have a relatively large overall rigidity, a relatively stable structure, and a relatively good capability of resisting interference from an external environment factor. In addition, because the overall rigidity of the push portion 30 is relatively large, and the push portion 30 comes into contact with and matches the driven member 230 on which the optical structure 320 is fastened, the push portion 30 can push a heavier optical structure 320. That is, the push portion 30 can periodically and continuously move the optical structure 320, and the driving force is stable. Therefore, the push portion 30 can push an optical structure 320 with a relatively large weight and a relatively large stroke, so that a structure of the camera module 300 is more easily diversified, and a relatively high photographing requirement for the optical structure 320 is more easily met.

A situation in which the top contour of the push portion 30 is a triangle may include a situation in which the top contour of the push portion 30 is an oblique triangle, a situation in which the top contour of the push portion 30 is an isosceles triangle, a situation in which the top contour of the push portion 30 is a curved-edge triangle, or a situation in which the top contour of the push portion 30 is a round triangle. This is not strictly limited in embodiments of this disclosure.

Referring to FIG. 11 to FIG. 19, in a possible implementation, an intersection line between the first side wall 31 and the second side wall 32 deviates relative to the first central axis A. That is, the intersection line between the first side wall 31 and the second side wall 32 is on a different plane from the first central axis A.

It should be noted that the intersection line between the first side wall 31 and the second side wall 32 includes a situation in which the first side wall 31 and the second side wall 32 are directly connected to form an intersection line, and also includes a situation in which extension directions of the first side wall 31 and the second side wall 32 are connected to form an intersection line.

For example, a length of the first side wall 31 is not equal to a length of the second side wall 32, the length of the first side wall 31 is a size of the first side wall 31 in an extension direction, and the length of the second side wall 32 is a size of the second side wall 32 in an extension direction. In this way, the intersection line between the first side wall 31 and the second side wall 32 deviates from the first central axis A, and the top contour of the push portion 30 formed by both the first side wall 31 and the second side wall 32 can present a form of an oblique triangle. This helps further ensure an asymmetrical form of the push portion 30 in structure, improve structural stability and rigidity of the push portion 30, and provide a stable driving force for the driven member 230.

Figure 20:
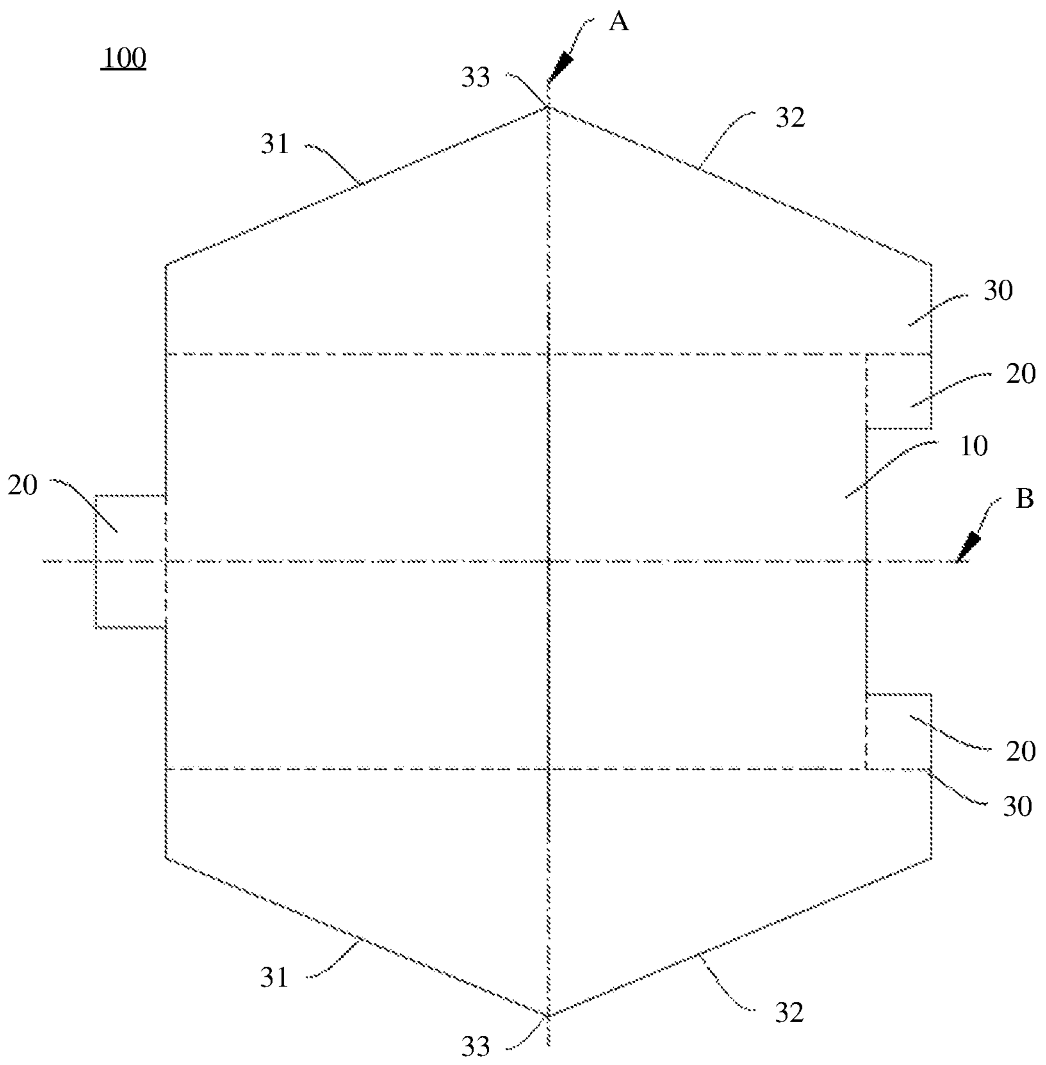
FIG. 20 is another schematic diagram of a structure of a push portion of a resonator according to Embodiment 2 of this disclosure.
Figure 21:
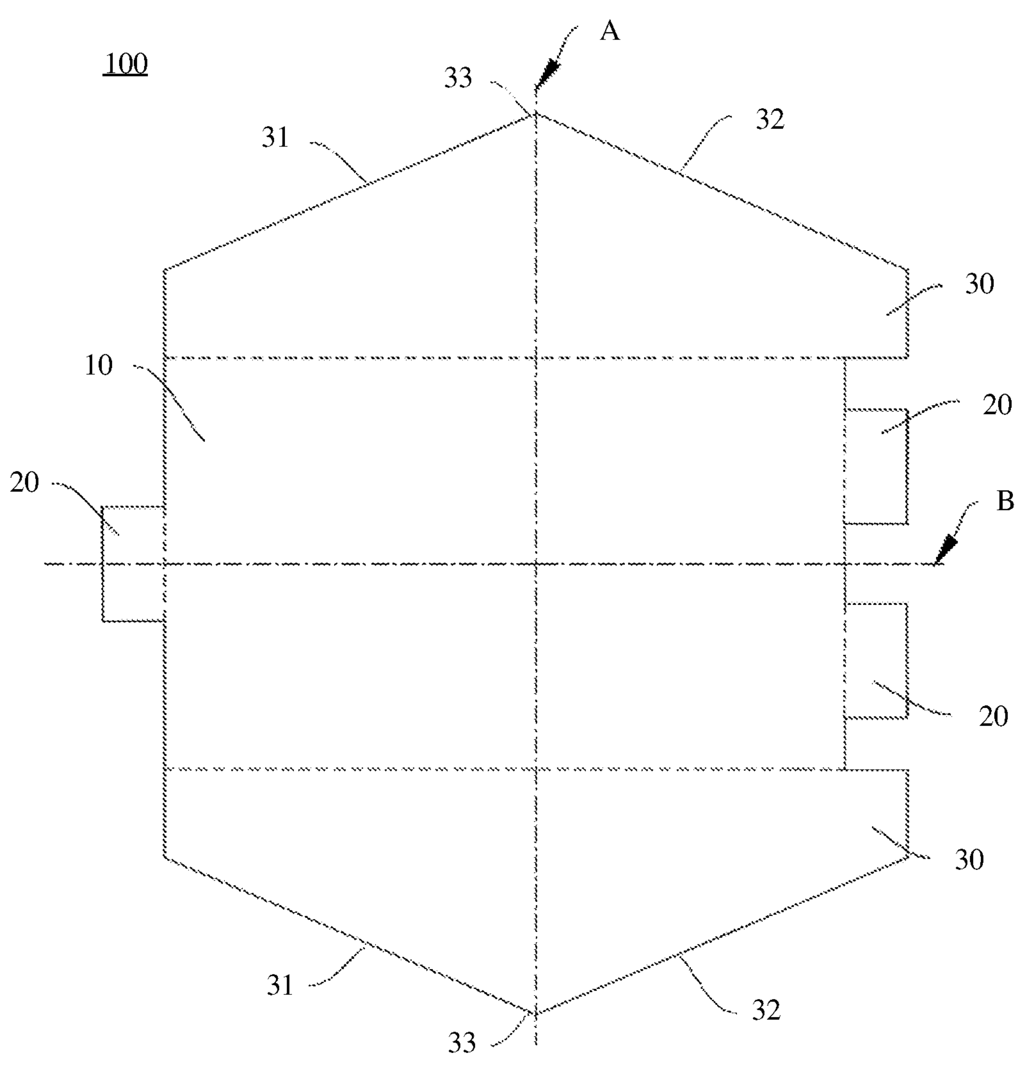
FIG. 21 is still another schematic diagram of a structure of a push portion of a resonator according to Embodiment 2 of this disclosure.

Referring to FIG. 20 to FIG. 21, in another possible implementation, an intersection line between the first side wall 31 and the second side wall 32 intersects with the first central axis A. That is, the intersection line between the first side wall 31 and the second side wall 32 falls on the first central axis A.

It should be noted that the intersection line between the first side wall 31 and the second side wall 32 includes a situation in which the first side wall 31 and the second side wall 32 are directly connected to form an intersection line, and also includes a situation in which extension directions of the first side wall 31 and the second side wall 32 are connected to form an intersection line.

For example, a length of the first side wall 31 is equal to a length of the second side wall 32, the length of the first side wall 31 is a size of the first side wall 31 in an extension direction, and the length of the second side wall 32 is a size of the second side wall 32 in an extension direction. In this way, the top contour of the push portion 30 formed by both the first side wall 31 and the second side wall 32 can present an isosceles triangle. This arrangement can further ensure structural stability and rigidity of the push portion 30 while ensuring a special asymmetrical form of the push portion 30 structure, and provide a stable driving force for the driven member 230.

Alternatively, a length of the first side wall 31 is not equal to a length of the second side wall 32, the length of the first side wall 31 is a size of the first side wall 31 in an extension direction, and the length of the second side wall 32 is a size of the second side wall 32 in an extension direction. In this way, the top contour of the push portion 30 formed by both the first side wall 31 and the second side wall 32 can present a form of an oblique triangle. This arrangement can improve structural rigidity and structural stability of the push portion 30 while ensuring a special asymmetrical form of the push portion 30 in structure.

Based on the foregoing description, it should be understood that asymmetrical disposing of the push portion 30 in structure has diversified and variable structural forms, and can meet multi-scenario application requirements of the resonator 100, which helps ensure that the resonator 100 can stably and effectively provide driving forces for driving the driven member 230 to move in two opposite directions.

In this embodiment of this disclosure, a contact foot 33 is formed at a junction between the first side wall 31 and the second side wall 32, the contact foot 33 can come into contact with and match the driven member 230, and a form of contact between the contact foot 33 and the driven member 230 may include line contact or surface contact.

Figure 22:
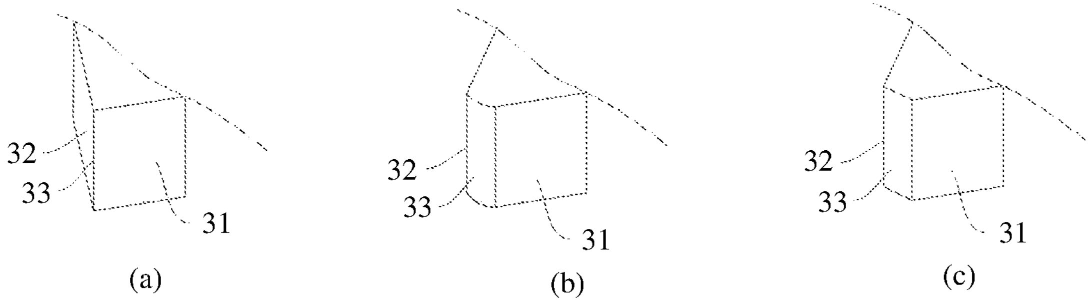
FIG. 22 is a schematic diagram of a partial structure of a push portion of a resonator according to an embodiment of this disclosure.

For example, when the form of contact between the contact foot 33 and the driven member 230 is line contact, the contact foot 33 may be in a shape shown in (a) in FIG. 22, that is, the first side wall 31 and the second side wall 32 are transitioned in an edge-angle manner. Alternatively, the contact foot 33 may be in a shape shown in (b) in FIG. 22, and a surface of the contact foot 33 that comes into contact with the driven member 230 is an arc surface. When the form of contact between the contact foot 33 and the driven member 230 is surface contact, the contact foot 33 may be in a shape shown in (c) in FIG. 22, and a surface of the contact foot 33 that comes into contact with the driven member 230 may be a plane. It should be understood that a shape of the contact foot 33 is not limited to the shapes described above, and can meet a shape that comes into contact with and matches the driven member 230, which is not strictly limited in this embodiment.

In this way, a relatively small contact area can be used to enable the push portion 30 to implement specific pre-pressure on the driven member 230, which helps increase rigidity of the push portion 30 and eliminate displacement caused by a gap between the push portion 30 and the driven member 230.

Referring to FIG. 2, FIG. 3, and FIG. 4, the driven member 230 includes contact portions 240 and a matching portion 250, where the contact portions 240 are bent and connected to the matching portion 250. The contact portions 240 come into contact with the push portion 30, and apply an elastic abutting force to the push portion 30. A gap is formed between the matching portion 250 and the stator 210, and the matching portion 250 is configured to be always connected to the optical structure 320, to drive the optical structure 320 to move. It should be understood that the first surface 101 of the main body portion 10 is a surface facing the matching portion 250, and the second surface 102 of the main body portion 10 is a surface facing away from the matching portion 250. When the vibration exciter 220 is fastened on the first surface 101 of the main body portion 10, a gap is formed between the matching portion 250 and the vibration exciter 220. When the vibration exciter 220 is not fastened on the first surface 101 of the main body portion 10, a gap is formed between the matching portion 250 and the main body portion 10. Therefore, there is always a gap between the matching portion 250 and the stator 210.

In this way, the contact portion 240 can provide a guide during movement of the driven member 230, so that the driven member 230 can implement a translation motion when pushed by the push portion 30. The matching portion 250 is connected to the contact portion 240 in a bending way, so that only a part of the driven member 230 that needs to come into contact with the push portion 30 can abut against the push portion 30, and a part of the driven member 230 that needs to be fastened to the optical structure 320 is kept away from the push portion 30, which helps to properly use a spatial layout of the driven member 230 and avoid mutual interference between the two parts due to function differences. An objective of being pushed by the push portion 30 to move can be achieved, and the optical structure 320 can be fastened, so that the optical structure 320 can be driven to move together during movement, thereby implementing focusing or zooming of the camera module 300.

It should be noted that the structure of the driven member 230 shown in FIG. 2 to FIG. 4 is merely an example of a connection relationship between the contact portion 240 and the matching portion 250, and does not specifically limit a connection position, a specific structure, or a quantity of each part. However, the structure shown in this embodiment of this disclosure does not constitute a specific limitation on the driven member 230, and a shape of the driven member 230 that can come into contact with and match the push portion 30 and can fasten the optical structure 320 may be used. This is not strictly limited in this embodiment of this disclosure.

A connection position and specific structures of the main body portion 10 and the push portion 30 in this disclosure are described below in detail with reference to two specific embodiments.

Embodiment 1

Referring to FIG. 12 to FIG. 18, in Embodiment 1 of this disclosure, the hollow region 34 is formed between the push portion 30 and the main body portion 10. This arrangement enables the push portion 30 to have diversified structural deformation possibilities based on a function of driving the driven member 230 to move, and is conducive to adapting to multi-scenario application requirements of the piezoelectric motor 200.

Specifically, the push portion 30 includes a first connecting arm 35 and a second connecting arm 36. The first connecting arm 35 and the second connecting arm 36 are respectively connected to two edges on a same side of the main body portion 10. One end of the first connecting arm 35 away from the main body portion 10 is connected to one end of the second connecting arm 36 away from the main body portion 10, and the two ends are arranged at an angle. It should be understood that the two edges on a same side of the main body portion 10 are two edges on one side of the main body portion 10.

The first side wall 31 is formed on a surface of the first connecting arm 35 away from the main body portion 10, the second side wall 32 is formed on a surface of the second connecting arm 36 away from the main body portion 10. The hollow region 34 is enclosed by the first connecting arm 35, the second connecting arm 36, and the push portion 30.

In this embodiment, the contact foot 33 is formed at the junction between the first side wall 31 and the second side wall 32, which is equivalent to that the contact foot 33 is formed at a junction between the first connecting arm 35 and the second connecting arm 36, and the contact foot 33 can come into contact with and match the driven member 230. A relatively small contact area can be used to enable the push portion 30 to implement specific pre-pressure on the driven member 230, which helps increase rigidity of the push portion 30 and eliminate displacement caused by a gap between the push portion 30 and the driven member 230. In addition, it is convenient to perform a pull-in or push-out action of the driven member 230, so as to implement a better optical effect, thereby improving overall convenience.

It should be noted that, for a structural possibility of the first side wall 31 and the second side wall 32 that can be achieved by a connection possibility of the first connecting arm 35 and the second connecting arm 36, refer to the foregoing descriptions. Details are not described herein again.

In this way, the first connecting arm 35 and the second connecting arm 36 can match to form the push portion 30 that includes the hollow region 34 and that can push the driven member 230. By changing structural forms of the first connecting arm 35 and the second connecting arm 36, a special asymmetrical form of the push portion 30 with respect to the first central axis A can be implemented. However, the asymmetrical arrangement of the push portion 30 in structure can enable the resonator 100 to have two resonance modes at different excitation frequencies as a whole. When the two resonance modes are excited by a corresponding frequency, the driven member 230 can move in two opposite directions, so that the driven member 230 can present directional reciprocating translation motion.

Specifically, the resonator 100 is configured to drive, when driven by the vibration exciter 220 at a first frequency, the driven member 230 to move in a first direction. The resonator 100 is further configured to drive, when driven by the vibration exciter 220 at a second frequency, the driven member 230 to move in a second direction, where the first direction is opposite to the second direction.

The first direction and the second direction may be understood as directions in which the driven member 230 moves relative to the resonator 100, that is, the driven member 230 can move toward two opposite directions relative to the resonator 100. For example, the driven member 230 moving toward the first direction is moving leftward, then the driven member 230 moving toward the second direction is moving rightward. When the piezoelectric motor 200 is applied to the camera module 300, moving leftward and moving rightward may be understood as moving forward and moving backward in an optical axis direction parallel to the camera module 300.

Figure 23:
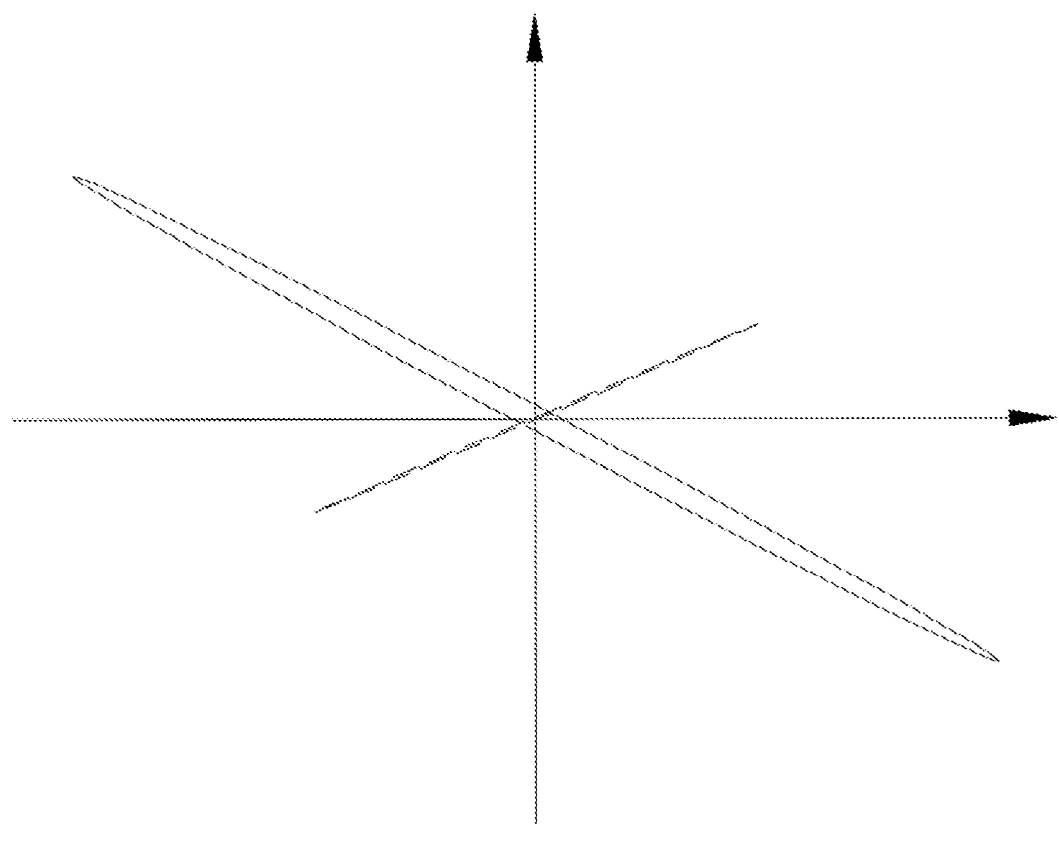
FIG. 23 is a schematic diagram of a track of a push portion of a resonator according to Embodiment 1 of this disclosure.

For example, as shown in FIG. 23, when an alternating signal at a frequency of 400 kHz is applied to the vibration exciter 220, a track diagram of the push portion 30 is a solid line in FIG. 23. That is, the push portion 30 moves in the second and fourth quadrants, and can push the driven member 230 to move leftward. When an alternating signal at a frequency of 600 kHz is applied to the vibration exciter 220, a track diagram of the push portion 30 is a dashed line in FIG. 23. That is, the push portion 30 may move in the first quadrant and the third quadrant, and can push the driven member 230 to move rightward.

The following describes the technical solution of this embodiment in detail with reference to a structure possibility of the push portion 30. A structure of the push portion 30 may include at least the following four solutions.

Solution 1 of the push portion 30: The first connecting arm 35 is formed by one connecting section, and the second connecting arm 36 is also formed by one connecting section.

Solution 2 of the push portion 30: The first connecting arm 35 is formed by continuously extending of at least two connecting sections that extend in different directions, and the second connecting arm 36 is formed by one connecting section.

Solution 3 of the push portion 30: The first connecting arm 35 is formed by one connecting section, and the second connecting arm 36 is formed by continuously extending of at least two connecting sections that extend in different directions.

Solution 4 of the push portion 30: The first connecting arm 35 is formed by continuously extending of at least two connecting sections that extend in different directions, and the second connecting arm 36 is also formed by continuously extending of at least two connecting sections that extend in different directions.

The following describes in detail possibilities of the foregoing four solutions of the push portion 30.

Referring to FIG. 13, FIG. 14, FIG. 15, and FIG. 16, in Solution 1 of the push portion 30, the first connecting arm 35 and the second connecting arm 36 each are formed by one connecting section, and extend oppositely and are connected to each other. In this way, not only the top contour of the push portion 30 is triangular, but also an overall contour of the push portion 30 is triangular. This arrangement helps further improve structural rigidity and stability of the push portion 30, so as to provide a reliable driving force for driving the driven member 230.

Figure 13:
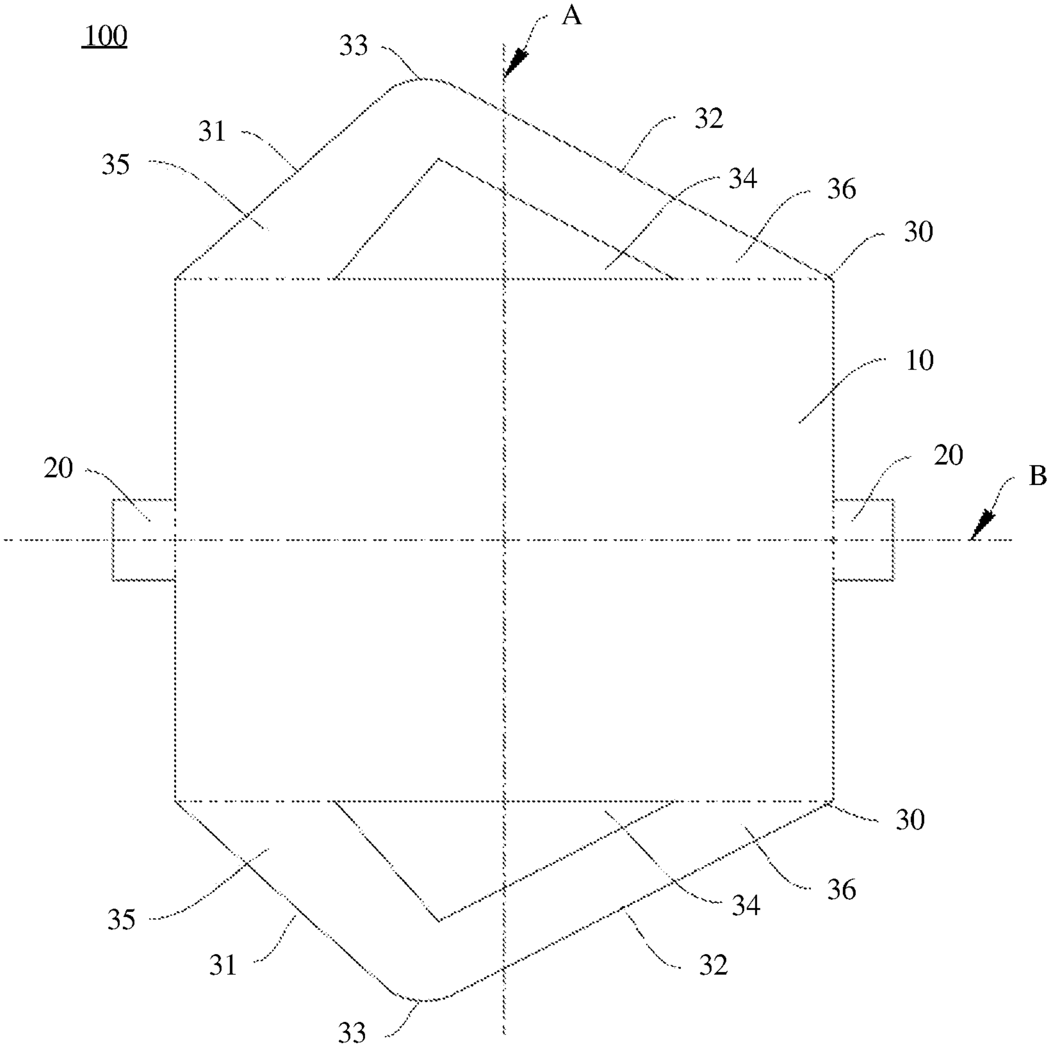
FIG. 13 is a schematic diagram of a structure of a resonator in Solution 1 of a push portion of a resonator according to Embodiment 1 of this disclosure.

Referring to FIG. 13, in a possible implementation, a size of a cross section of the first connecting arm 35 gradually changes in the extension direction, and a size of a cross section of the second connecting arm 36 remains unchanged in the extension direction. That is, the first connecting arm 35 is a connecting arm with a variable cross section, and the second connecting arm 36 is a connecting arm with a constant cross section. The extension direction of the first connecting arm 35 intersects with the extension direction of the second connecting arm 36.

Figure 14:
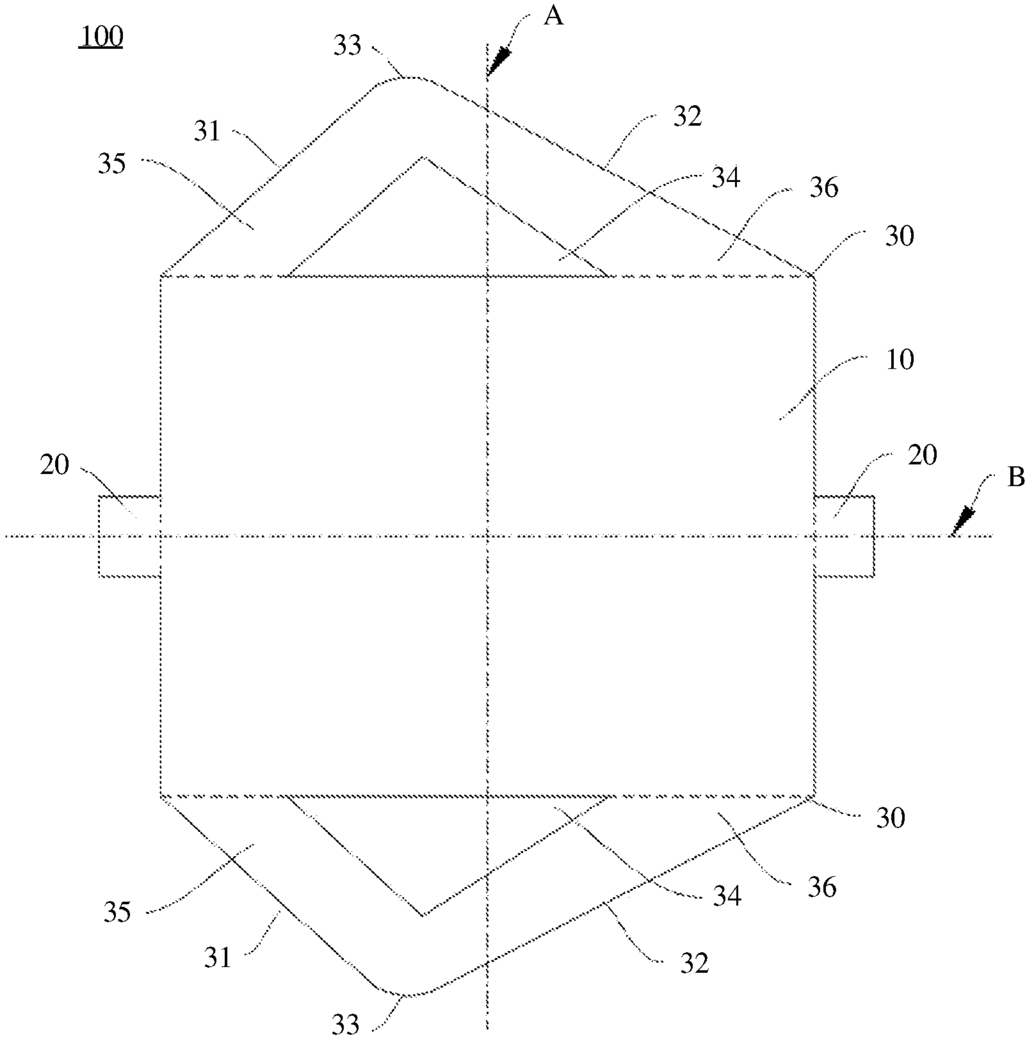
FIG. 14 is another schematic diagram of a structure of a resonator in Solution 1 of a push portion of a resonator according to Embodiment 1 of this disclosure.

Referring to FIG. 14, in another possible implementation, a size of a cross section of the first connecting arm 35 remains unchanged in the extension direction, and a size of a cross section of the second connecting arm 36 also gradually changes in the extension direction. That is, the first connecting arm 35 is a connecting arm with a constant cross section, and the second connecting arm 36 is a connecting arm with a variable cross section. The extension direction of the first connecting arm 35 intersects with the extension direction of the second connecting arm 36.

Figure 15:
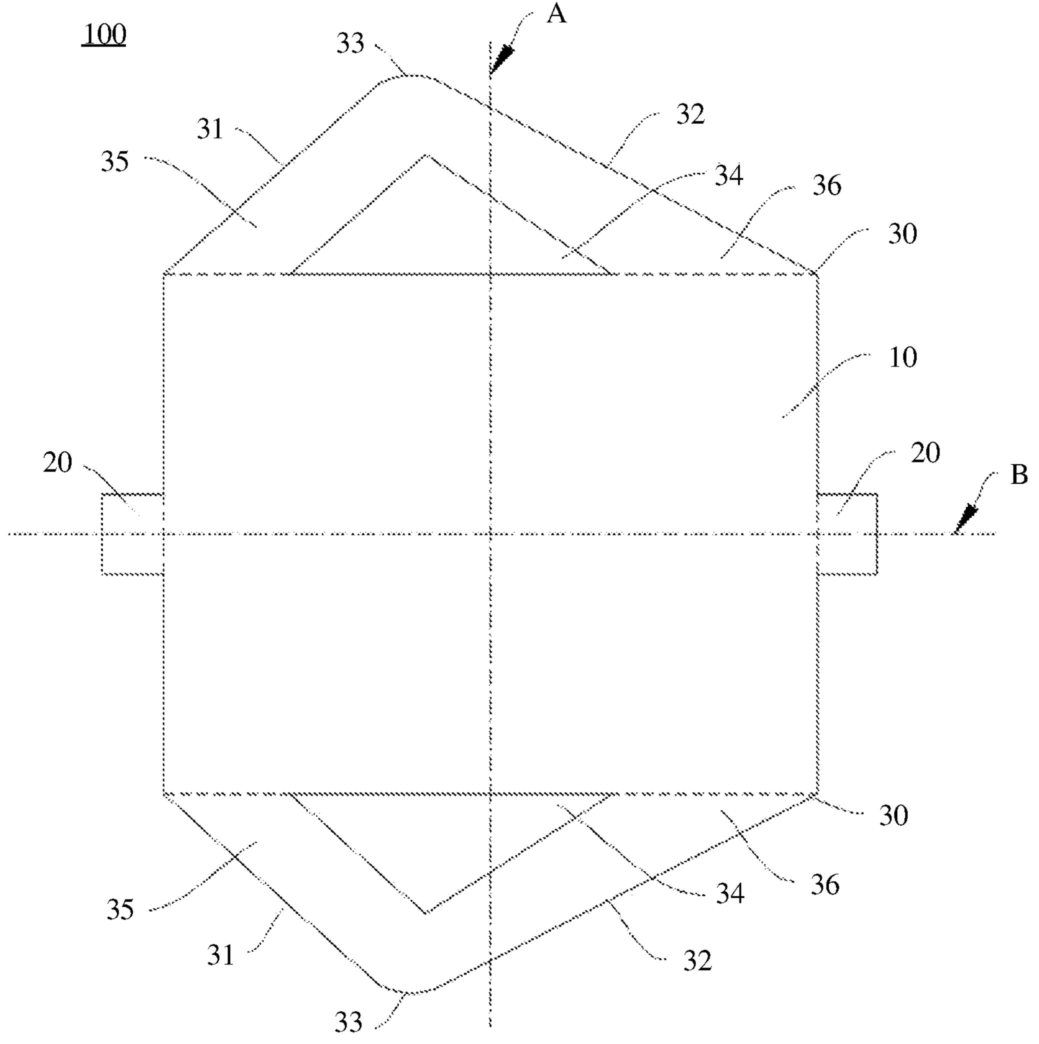
FIG. 15 is still another schematic diagram of a structure of a resonator in Solution 1 of a push portion of a resonator according to Embodiment 1 of this disclosure.

Referring to FIG. 15, in a possible implementation, a size of a cross section of the first connecting arm 35 gradually changes in the extension direction, and a size of a cross section of the second connecting arm 36 also gradually changes in the extension direction. That is, the first connecting arm 35 is a connecting arm with a variable cross section, and the second connecting arm 36 is also a connecting arm with a variable cross section.

The extension direction of the first connecting arm 35 intersects with the extension direction of the second connecting arm 36, and a change amplitude of the size of the cross section of the first connecting arm 35 may be equal to or not equal to a change amplitude of the size of the cross section of the second connecting arm 36. This is not strictly limited in this embodiment.

Figure 16:
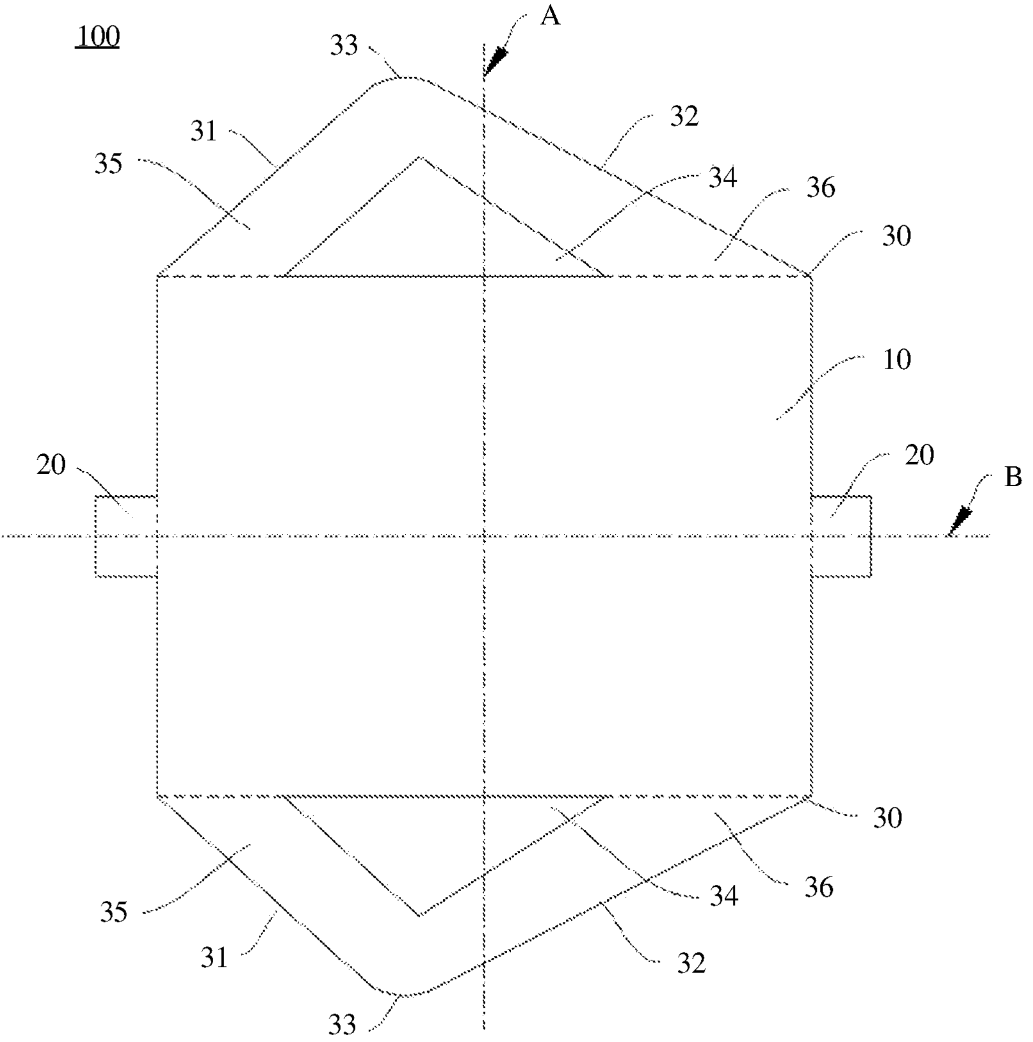
FIG. 16 is yet another schematic diagram of a structure of a resonator in Solution 1 of a push portion of a resonator according to Embodiment 1 of this disclosure.

Referring to FIG. 16, in still another possible implementation, a size of a cross section of the first connecting arm 35 remains unchanged in the extension direction, and a size of a cross section of the second connecting arm 36 also remains unchanged in the extension direction. That is, the first connecting arm 35 is a connecting arm with a constant cross section, and the second connecting arm 36 is a connecting arm with a constant cross section.

The extension direction of the first connecting arm 35 intersects with the extension direction of the second connecting arm 36. The size of the cross section of the first connecting arm 35 may be equal to or not equal to the size of the cross section of the second connecting arm 36. This is not strictly limited in this embodiment.

It should be noted that one end of the first connecting arm 35 connected to the main body portion 10 may be completely connected to the main body portion 10, or may be partially connected to the main body portion 10, and partially suspended on a periphery of the main body portion 10. When the one end of the first connecting arm 35 connected to the main body portion 10 is partially connected to the main body portion 10 and partially suspended on the periphery of the main body portion 10, the part of the first connecting arm 35 suspended on the periphery of the main body portion 10 may be connected to the fastening portion 20, or may be disposed at an interval with the fastening portion 20. One end of the second connecting arm 36 connected to the main body portion 10 may also be completely connected to the main body portion 10, or may be partially connected to the main body portion 10, and partially suspended on a periphery of the main body portion 10. However, when the one end of the second connecting arm 36 connected to the main body portion 10 is partially connected to the main body portion 10, and partially suspended on the periphery of the main body portion 10, the part of the second connecting arm 36 suspended on the periphery of the main body portion 10 may be connected to the fastening portion 20, or may be disposed at an interval with the fastening portion 20. This is not strictly limited in this embodiment.

Referring to FIG. 12, in Solution 2 of the push portion 30, content that is the same as that in Solution 1 is not repeated. A difference from Solution 1 is that the first connecting arm 35 is formed by continuously extending of two connecting sections that extend in different directions.

For example, the first connecting arm 35 includes a first connecting section 351 and a second connecting section 352. The first connecting section 351 extends from the main body portion 10 in a direction parallel to the first central axis A, the second connecting section 352 is bent and connected to the first connecting section 351, and the second connecting section 352 and the second connecting arm 36 extend oppositely and are connected to each other. The extension direction of the second connecting section 352 intersects with the extension direction of the second connecting arm 36.

It should be noted that the first connecting section 351 may be a connecting section with a constant cross section, or may be a connection section with a variable cross section. The second connecting section 352 may be a connecting section with a constant cross section, or may be a connecting section with a variable cross section. For permutation and combination of cross section types of the first connecting section 351 and the second connecting section 352, refer to the foregoing descriptions. Details are not described herein again.

In addition, one end of the first connecting section 351 connected to the main body portion 10 may be completely connected to the main body portion 10, or may be partially connected to the main body portion 10, and partially suspended on a periphery of the main body portion 10. However, when the one end of the first connecting section 351 connected to the main body portion 10 is partially connected to the main body portion 10, and partially suspended on the periphery of the main body portion 10, the part of the first connecting section 351 suspended on the periphery of the main body portion 10 may be connected to the fastening portion 20, or may be disposed at an interval with the fastening portion 20. One end of the second connecting arm 36 connected to the main body portion 10 may also be completely connected to the main body portion 10, or may be partially connected to the main body portion 10, and partially suspended on a periphery of the main body portion 10. However, when the one end of the second connecting arm 36 connected to the main body portion 10 is partially connected to the main body portion 10, and partially suspended on the periphery of the main body portion 10, the part of the second connecting arm 36 suspended on the periphery of the main body portion 10 may be connected to the fastening portion 20, or may be disposed at an interval with the fastening portion 20. This is not strictly limited in this embodiment.

In this way, one or more of sizes of the first side wall 31 and the second side wall 32, a relative position between the first side wall 31 and the second side wall 32, a structural form and a size of the hollow region 34 can be changed by changing one or more of a size of the first connecting section 351 (such as the length of the first connecting section 351 in the extension direction and the size of the cross section of the first connecting section 351), a size of the second connecting section 352 (such as the length of the second connecting section 352 in the extension direction and the size of the cross section of the second connecting section 352), a size of the second connecting arm 36 (such as the length of the second connecting arm 36 in the extension direction and the size of the cross section of the second connecting arm 36), so that the structure of the push portion 30 may be diversified, and the resonator 100 is enabled to have multi-scenario application possibilities.

Figure 17:
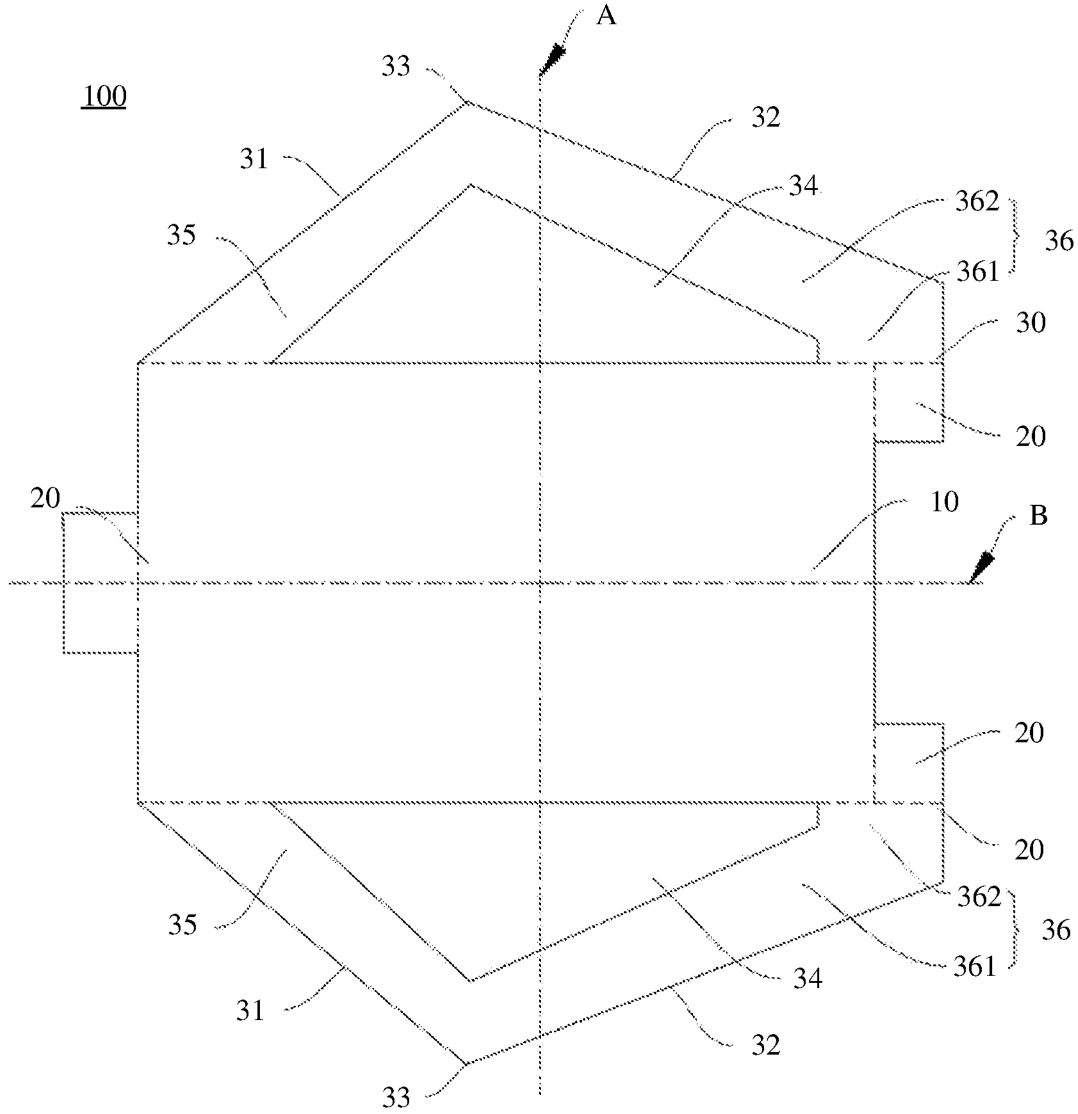
FIG. 17 is a schematic diagram of a structure of a resonator in Solution 3 of a push portion of a resonator according to Embodiment 1 of this disclosure.

Referring to FIG. 17, in Solution 3 of the push portion 30, content that is the same as that in Solution 1 is not repeated. A difference from Solution 1 is that the second connecting arm 36 is formed by continuously extending of two connecting sections that extend in different directions.

For example, the second connecting arm 36 includes a third connecting section 361 and a fourth connecting section 362. The third connecting section 361 extends from the main body portion 10 in a direction parallel to the first central axis A, the fourth connecting section 362 is bent and connected to the third connecting section 361, and the fourth connecting section 362 and the first connecting arm 35 extend oppositely and are connected to each other. The extension direction of the fourth connecting section 362 intersects with the extension direction of the first connecting arm 35.

It should be noted that the third connecting section 361 may be a connecting section with a constant cross section, or may be a connecting section with a variable cross section. The fourth connecting section may be a connecting section with a constant cross section, or may be a connecting section with a variable cross section. For permutation and combination of cross section types of the third connecting section 361 and the fourth connecting section 362, refer to the foregoing descriptions. Details are not described herein again.

In addition, one end of the third connecting section 361 connected to the main body portion 10 may be completely connected to the main body portion 10, or may be partially connected to the main body portion 10, and partially suspended on a periphery of the main body portion 10. However, when the one end of the third connecting section 361 connected to the main body portion 10 is partially connected to the main body portion 10, and partially suspended on the periphery of the main body portion 10, the part of the third connecting section 361 suspended on the periphery of the main body portion 10 may be connected to the fastening portion 20, or may be disposed at an interval with the fastening portion 20. One end of the first connecting arm 35 connected to the main body portion 10 may also be completely connected to the main body portion 10, or may be partially connected to the main body portion 10, and partially suspended on a periphery of the main body portion 10. However, when the one end of the first connecting arm 35 connected to the main body portion 10 is partially connected to the main body portion 10, and partially suspended on the periphery of the main body portion 10, the part of the first connecting arm 35 suspended on the periphery of the main body portion 10 may be connected to the fastening portion 20, or may be disposed at an interval with the fastening portion 20. This is not strictly limited in this embodiment.

In this way, one or more of sizes of the first side wall 31 and the second side wall 32, a relative position between the first side wall 31 and the second side wall 32, a structural form and a size of the hollow region 34 can be changed by changing one or more of a size of the first connecting arm 35 (such as the length of the first connecting arm 35 in the extension direction and the size of the cross section of the first connecting arm 35), a size of the third connecting section 361 (such as the length of the third connecting section 361 in the extension direction and the size of the cross section of the third connecting section 361), a size of the fourth connecting section 362 (such as the length of the fourth connecting section 362 in the extension direction and the size of the cross section of the fourth connecting section 362), so that the structure of the push portion 30 may be diversified, and the resonator 100 is enabled to have multi-scenario application possibilities.

Figure 18:
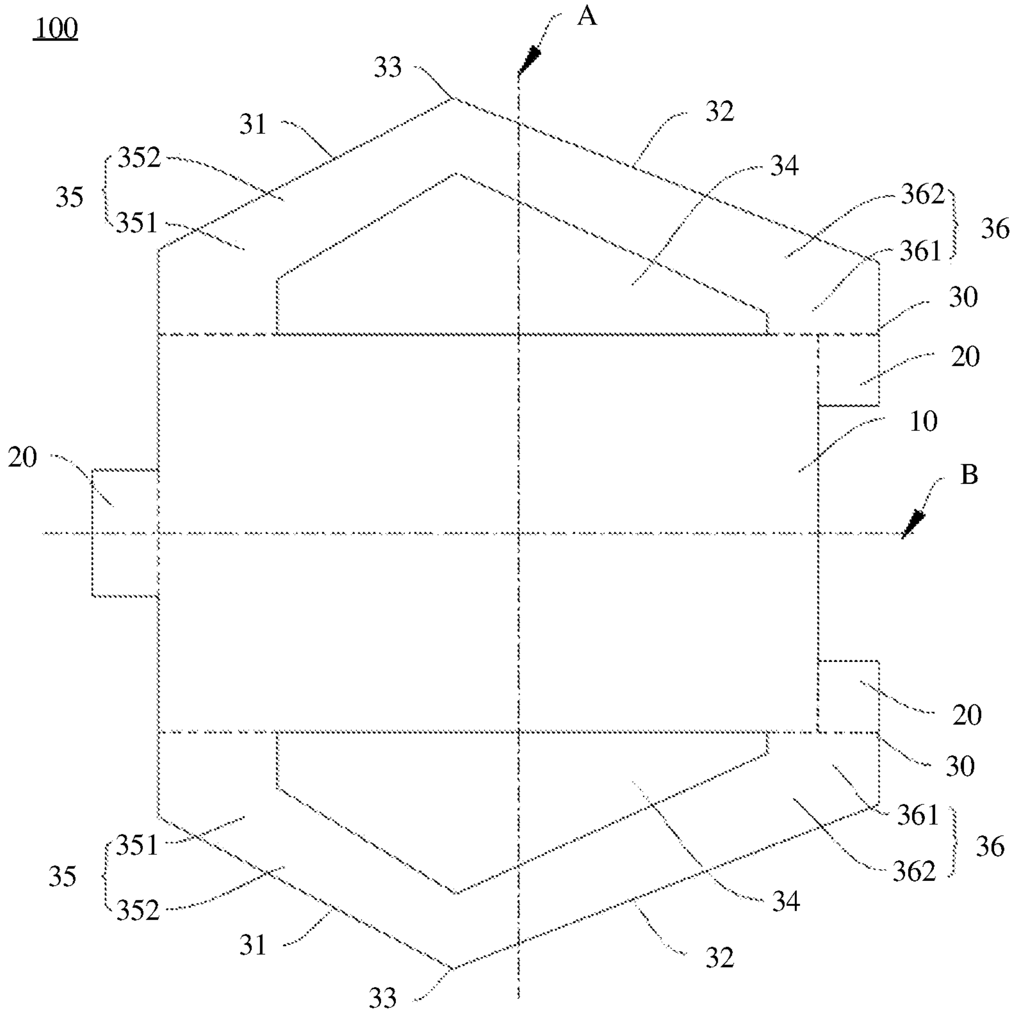
FIG. 18 is a schematic diagram of a structure of a resonator in Solution 4 of a push portion of a resonator according to Embodiment 1 of this disclosure.

Referring to FIG. 18, in Solution 4 of the push portion 30, content that is the same as that in Solution 2 is not repeated. A difference from Solution 2 is that the second connecting arm 36 is formed by continuously extending of two connecting sections that extend in different directions.

For example, the second connecting arm 36 includes a third connecting section 361 and a fourth connecting section 362. The third connecting section 361 extends from the main body portion 10 in a direction parallel to the first central axis A, the fourth connecting section 362 is bent and connected to the third connecting section 361, and the fourth connecting section 362 and the second connecting section 352 extend oppositely and are connected to each other. The extension direction of the fourth connecting section 362 intersects with the extension direction of the second connecting section 352.

It should be noted that the third connecting section 361 may be a connecting section with a constant cross section, or may be a connecting section with a variable cross section. The fourth connecting section 362 may be a connecting section with a constant cross section, or may be a connecting section with a variable cross section. For permutation and combination of cross section types of the third connecting section 361 and the fourth connecting section 362, refer to the foregoing descriptions. Details are not described herein again.

In addition, one end of the first connecting section 351 connected to the main body portion 10 may be completely connected to the main body portion 10, or may be partially connected to the main body portion 10, and partially suspended on a periphery of the main body portion 10. However, when the one end of the first connecting section 351 connected to the main body portion 10 is partially connected to the main body portion 10, and partially suspended on the periphery of the main body portion 10, the part of the first connecting section 351 suspended on the periphery of the main body portion 10 may be connected to the fastening portion 20, or may be disposed at an interval with the fastening portion 20. One end of the third connecting section 361 connected to the main body portion 10 may be completely connected to the main body portion 10, or may be partially connected to the main body portion 10, and partially suspended on a periphery of the main body portion 10. However, when the one end of the third connecting section 361 connected to the main body portion 10 is partially connected to the main body portion 10, and partially suspended on the periphery of the main body portion 10, the part of the third connecting section 361 suspended on the periphery of the main body portion 10 may be connected to the fastening portion 20, or may be disposed at an interval with the fastening portion 20.

In this way, one or more of sizes of the first side wall 31 and the second side wall 32, a relative position between the first side wall 31 and the second side wall 32, and a structural form and a size of the hollow region 34 can be changed by changing one or more of a size of the first connecting section 351 (such as the length of the first connecting section 351 in the extension direction and the size of the cross section of the first connecting section 351), a size of the second connecting section 352 (such as the length of the second connecting section 352 in the extension direction and the size of the cross section of the second connecting section 352), a size of the third connecting section 361 (such as the length of the third connecting section 361 in the extension direction and the size of the cross section of the third connecting section 361), a size of the fourth connecting section 362 (such as the size of the fourth connecting section 362 in the extension direction and the size of the cross section of the fourth connecting section 362), so that the structure of the push portion 30 may be diversified, and the resonator 100 is enabled to have multi-scenario application possibilities.

With reference to the foregoing four structural solutions of the push portion 30, it should be understood that, by changing structural forms and sizes of the first connecting arm 35 and the second connecting arm 36, sizes of and a relative position relationship between the first side wall 31 and the second side wall 32 can be adjusted, and a structural form and a size of the hollow region 34 can also be adjusted (for example, the hollow region 34 in Solution 1 may be triangular, the hollow region 34 in Solution 2 and Solution 3 may be quadrilateral, and the hollow region 34 in Solution 4 may be pentagonal). That is, the structural form and the size of the hollow region 34 change with the structural forms and the sizes of the first connecting arm 35 and the second connecting arm 36. A variation form and a combination manner of sizes of the first connecting arm 35 and the second connecting arm 36 are not listed herein again.

In this way, the sizes of the first connecting arm 35 and the second connecting arm 36 may be adjusted based on actual application (such as material cost control, a rigidity requirement, and an actuating force requirement) of the resonator 100, adapt to multi-scenario application requirements. That is, by adjusting the sizes of the first connecting arm 35 and the second connecting arm 36, a structural form of the push portion 30 that can be finally presented is changed, so that photographing quality of the camera module 300 to which the resonator 100 is applied is improved. For example, the driven member 230 can push the optical structure 320 with a relatively large weight and a relatively large stroke, or can push the optical structure 320 more quickly, to switch between positions of the optical structures 320 within a relatively short time, and position matching between the optical structures 320 required for implementing a zooming effect is implemented.

Figure 19:
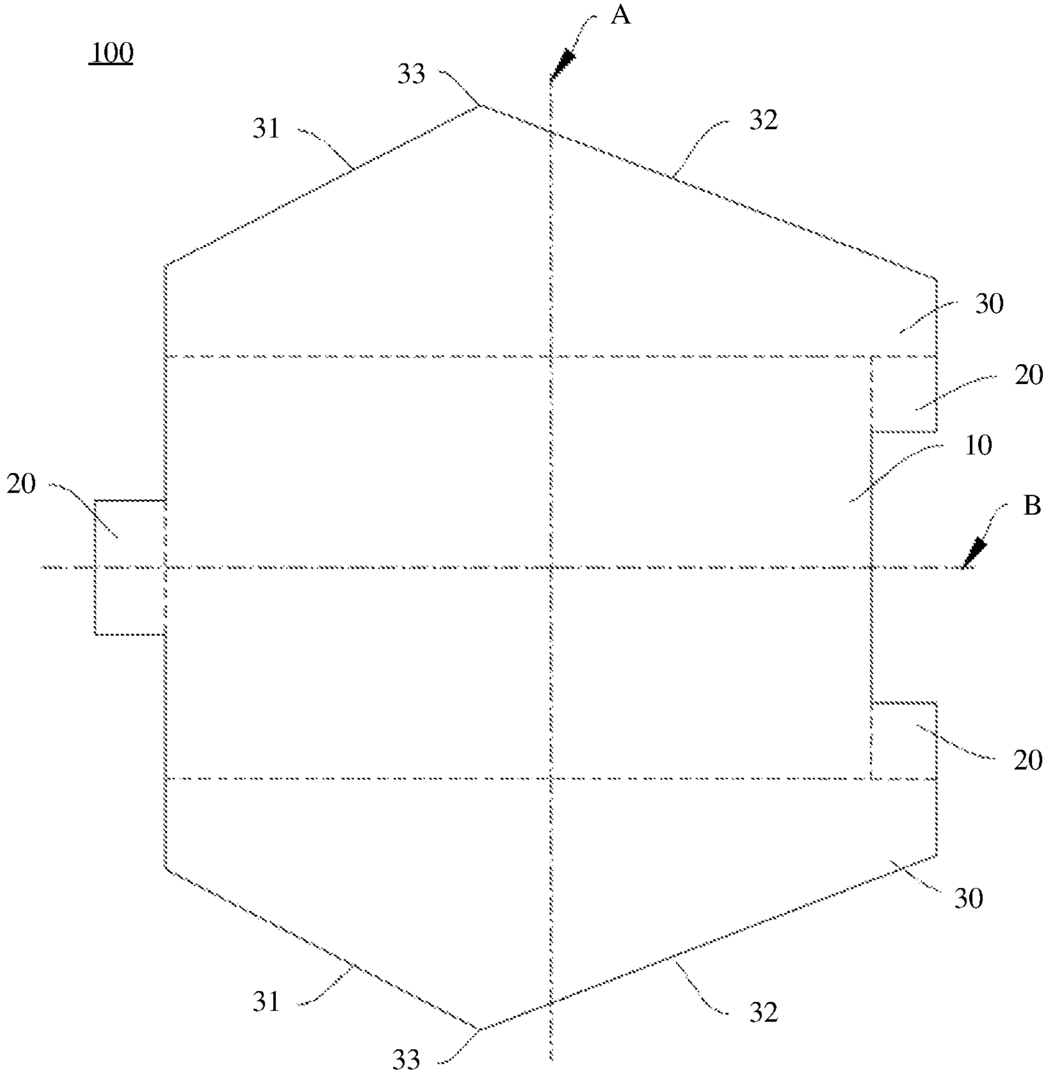
FIG. 19 is a schematic diagram of a structure of a push portion of a resonator according to Embodiment 2 of this disclosure.

Referring to FIG. 19, FIG. 20, and FIG. 21, in Embodiment 2 of this disclosure, content that is the same as that in Embodiment 1 is not described again. A difference from the Embodiment 1 is that the push portion 30 is a solid closed structure.

In this embodiment, one end of the push portion 30 connected to the main body portion 10 may be completely connected to the main body portion 10, or may be partially connected to the main body portion 10, and partially suspended on a periphery of the main body portion 10. In other words, the push portion 30 may have a length equal to that of the main body portion 10, or the push portion 30 may have a length not equal to that of the main body portion 10 (for example, a length of the push portion 30 is greater than a length of the main body portion 10). However, when the one end of the push portion 30 connected to the main body portion 10 is partially connected to the main body portion 10, and partially suspended on the periphery of the main body portion 10, the part of the push portion 30 suspended on the periphery of the main body portion 10 may be connected to the fastening portion 20, or may be disposed at an interval with the fastening portion 20.

It may be understood that, in this embodiment, when structures of the fastening portions 20 on the two sides of the first central axis are asymmetrical (for example, quantities of the fastening portions 20 on the two sides of the first central axis A are inconsistent), the push portion 30 may be asymmetrically disposed with respect to the first central axis A, as shown in FIG. 19, or the push portion 30 may be symmetrically disposed with respect to the first central axis A, as shown in FIG. 20 and FIG. 21. However, when the push portion 30 is asymmetrically disposed with respect to the first central axis A, due to a structural asymmetry of the fastening portion 20, a special asymmetrical form of the resonator 100 in structure can also be implemented. With the asymmetrical arrangement of the resonator 100 in structure, the resonator 100 has more diversified and variable structural forms, and may further be adjusted for a space size of a camera module 300 to which the piezoelectric motor 200 is applied, to achieve an objective of properly using space. In addition, the resonator 100 can have two resonance modes at different excitation frequencies, so that the driven member performs directional reciprocating translation motion.

It should be noted that the push portion 30 may be triangular, and the push portion 30 may alternatively be polygonal. A structural form of the push portion 30 is not strictly arranged, provided that the contact foot 33 can be formed at the junction between the first side wall 31 and the second side wall 32 of the push portion 30.

In this way, the push portion 30 that is solidly closed and can push the driven member 230 can be formed, and a special asymmetrical form of the push portion 30 with respect to the first central axis A can be implemented through the structural form of the push portion 30. However, the asymmetrical arrangement of the push portion 30 in structure can enable the resonator 100 to have two resonance modes at different excitation frequencies as a whole. When the two resonance modes are excited by a corresponding frequency, the driven member 230 can move in two opposite directions, so that the driven member 230 can present directional reciprocating translation motion.

Figure 24:
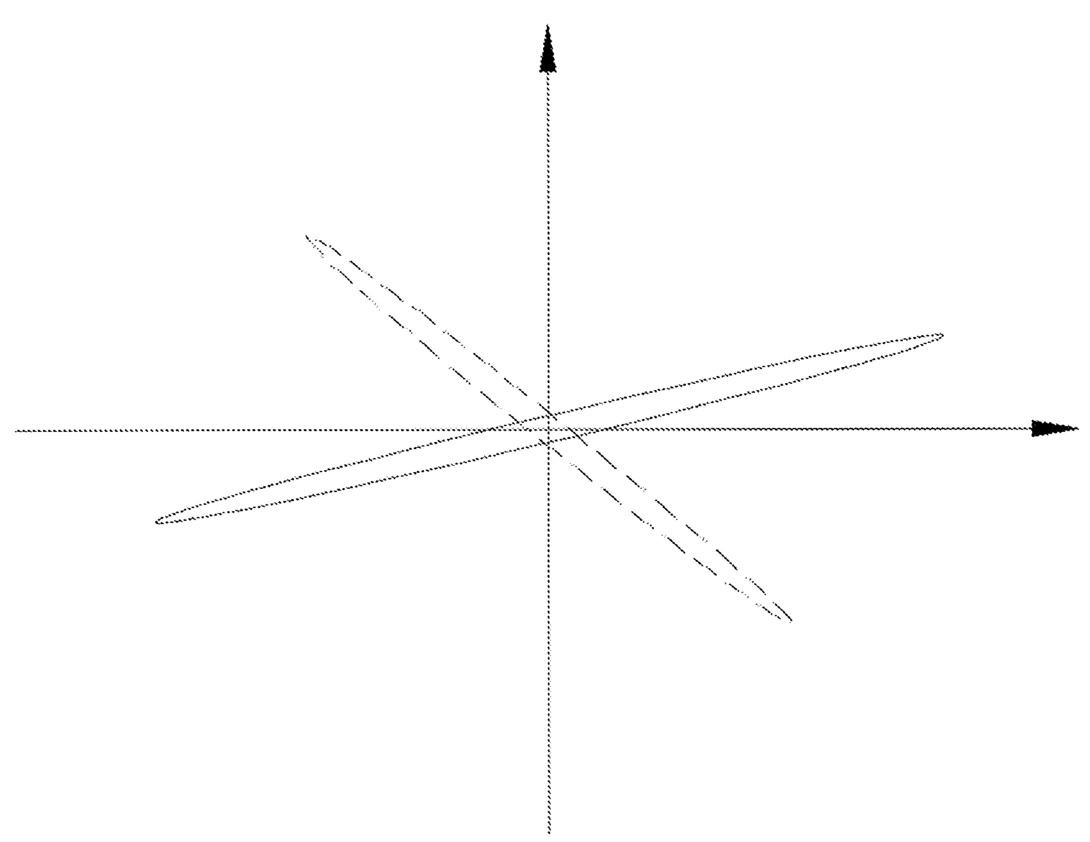
FIG. 24 is a schematic diagram of a track of a push portion of a resonator according to Embodiment 2 of this disclosure.

For example, as shown in FIG. 24, when an alternating signal at a frequency of 600 kHz is applied to the vibration exciter 220, a track diagram of the push portion 30 is a solid line in FIG. 24. That is, the push portion 30 moves in the first quadrant and the third quadrant, and can push the driven member 230 to move rightward. When an alternating signal at a frequency of 700 kHz is applied to the vibration exciter 220, a track diagram of the push portion 30 is a dashed line in FIG. 24. That is, the push portion 30 may move in the second quadrant and the fourth quadrant, and can push the driven member 230 to move leftward.

Embodiments of this disclosure are described above in detail. The principle and implementation of this disclosure are described herein through specific examples. The description about embodiments is merely provided to help understand the method and core ideas of this disclosure. In addition, a person of ordinary skill in the art can make variations and modifications to this disclosure in terms of the specific implementations and application scopes according to the ideas of this disclosure. Therefore, the content of specification shall not be construed as a limit to this disclosure.

What is claimed is:

1. A piezoelectric motor comprising:

a vibration exciter; and a resonator comprising a main body portion and a push portion, wherein:

the main body portion comprises a first central axis, and the main body portion is distributed on two sides of the first central axis, the vibration exciter is fastened to the main body portion, and the push portion is connected to the main body portion and distributed on the two sides of the first central axis, the push portion is of an asymmetrical structure with respect to the first central axis, and the push portion is configured to push, when excited by the vibration exciter, a driven member to move.

2. The piezoelectric motor according to claim 1, wherein the push portion comprises a first side wall and a second side wall, a contact foot configured to come into contact with the driven member is formed at a junction between the first side wall and the second side wall, and the first side wall and the second side wall are arranged at an angle.

3. The piezoelectric motor according to claim 2, wherein an intersection line between the first side wall and the second side wall deviates relative to the first central axis, a length of the first side wall is not equal to a length of the second side wall, the length of the first side wall is a size of the first side wall in a first extension direction, and the length of the second side wall is a size of the second side wall in a second extension direction.

4. The piezoelectric motor according to claim 3, wherein a hollow region is formed between the push portion and the main body portion; or the push portion is a solid closed structure.

5. The piezoelectric motor according to claim 4, wherein the hollow region is formed between the push portion and the main body portion, the push portion comprises a first connecting arm and a second connecting arm, the first connecting arm and the second connecting arm are respectively connected to two edges on a same side of the main body portion, and one end of the first connecting arm away from the main body portion is connected to one end of the second connecting arm away from the main body portion;

the first side wall and the second side wall are formed on surfaces that are of the first connecting arm and the second connecting arm and that are away from the main body portion, and the hollow region is enclosed by the push portion; and a size of a cross section of the first connecting arm changes in the first extension direction, and/or a size of a cross section of the second connecting arm changes in the second extension direction.

6. The piezoelectric motor according to claim 4, wherein the hollow region is formed between the push portion and the main body portion, the push portion comprises a first connecting arm and a second connecting arm, the first connecting arm and the second connecting arm are respectively connected to two edges on a same side of the main body portion, and one end of the first connecting arm away from the main body portion is connected to one end of the second connecting arm away from the main body portion;

the first side wall and the second side wall are formed on surfaces that are of the first connecting arm and the second connecting arm and that are away from the main body portion, and the hollow region is enclosed by the push portion; and a size of a cross section of the first connecting arm remains unchanged in the first extension direction, and/or a size of a cross section of the second connecting arm remains unchanged in the second extension direction.

7. The piezoelectric motor according to claim 2, wherein an intersection line between the first side wall and the second side wall intersects with the first central axis; and a length of the first side wall is equal to a length of the second side wall, the length of the first side wall is a size of the first side wall in a first extension direction, and the length of the second side wall is a size of the second side wall in a second extension direction; or a length of the first side wall is not equal to a length of the second side wall, the length of the first side wall is a size of the first side wall in the first extension direction, and the length of the second side wall is a size of the second side wall in the second extension direction.

8. The piezoelectric motor according to claim 2, wherein a form of contact between the contact foot and the driven member comprises line contact or surface contact.

9. The piezoelectric motor according to claim 1 wherein the piezoelectric motor further comprises a fastening portion connected to the main body portion, the fastening portion and the push portion are on different sides of the main body portion, and the fastening portion is capable of fastening the piezoelectric motor to an external structural member; and there are two fastening portions, and the two fastening portions are distributed on two sides of the first central axis; or there are a plurality of fastening portions, the plurality of fastening portions are distributed on two sides of the first central axis, and a quantity of fastening portions distributed on one side of the first central axis is consistent with a quantity of fastening portions distributed on the other side of the first central axis; or there are a plurality of fastening portions, the plurality of fastening portions are distributed on two sides of the first central axis, and a quantity of fastening portions distributed on one side of the first central axis is inconsistent with a quantity of fastening portions distributed on the other side of the first central axis.

10. The piezoelectric motor according to claim 1, wherein the main body portion further comprises a second central axis, and the second central axis is perpendicular to the first central axis; and there is one push portion, and the one push portion is distributed on one side of the second central axis; or there are two push portions, and the two push portions are symmetrically distributed on two sides of the second central axis.

11. The piezoelectric motor according to claim 1, wherein vibration generated by the vibration exciter in a power supply state is amplifiable by the main body portion and transferrable to the push portion, to enable the push portion to drive the driven member to move; and there is one vibration exciter, and the one vibration exciter is connected to one side of two opposite sides of the main body portion; or there are two vibration exciters, and the two vibration exciters are respectively connected to two opposite sides of the main body portion.

12. The piezoelectric motor according to claim 1, wherein the resonator is configured to drive, when driven by the vibration exciter at a first frequency, the driven member to move in a first direction; and the resonator is further configured to drive, when driven by the vibration exciter at a second frequency, the driven member to move in a second direction, wherein the first frequency is different from the second frequency and the first direction is opposite to the second direction.

13. The piezoelectric motor according to claim 1, wherein the piezoelectric motor further comprises the driven member, and the driven member comes into contact with the push portion, and is configured to move relative to the push portion when pushed by the push portion.

14. The piezoelectric motor according to claim 13, wherein the piezoelectric motor further comprises a stator, the driven member comprises contact portions and a matching portion, wherein the contact portions are bent and connected to the matching portion; the contact portions come into contact with the push portion, and apply an elastic abutting force to the push portion; and a gap is formed between the matching portion and the stator, and the matching portion is configured to be always connected to an optical structure, to drive the optical structure to move.

15. A camera module comprising a base, an optical structure, and a piezoelectric motor, wherein the piezoelectric motor comprises:

a vibration exciter; and a resonator comprising a main body portion and a push portion, wherein:

the main body portion comprises a first central axis, and the main body portion is distributed on two sides of the first central axis, the vibration exciter is fastened to the main body portion, the push portion is connected to the main body portion and distributed on the two sides of the first central axis, the push portion is of an asymmetrical structure with respect to the first central axis, and the push portion is configured to push, when excited by the vibration exciter, a driven member to move; and the resonator is fastened to the base, and the optical structure is fastened to the driven member, to move relative to the base when driven by the resonator.

16. The camera module according to claim 15, wherein the push portion comprises a first side wall and a second side wall, a contact foot configured to come into contact with the driven member is formed at a junction between the first side wall and the second side wall, and the first side wall and the second side wall are arranged at an angle.

17. The camera module according to claim 16, wherein an intersection line between the first side wall and the second side wall deviates relative to the first central axis, a length of the first side wall is not equal to a length of the second side wall, the length of the first side wall is a size of the first side wall in first extension direction, and the length of the second side wall is a size of the second side wall in a second extension direction.

18. The camera module according to claim 16, wherein an intersection line between the first side wall and the second side wall intersects with the first central axis; and a length of the first side wall is equal to a length of the second side wall, the length of the first side wall is a size of the first side wall in a first extension direction, and the length of the second side wall is a size of the second side wall in a second extension direction; or a length of the first side wall is not equal to a length of the second side wall, the length of the first side wall is a size of the first side wall in the first extension direction, and the length of the second side wall is a size of the second side wall in the second extension direction.

19. An electronic device comprising:

a housing and a camera module accommodated in the housing;

wherein the camera module comprises a base, an optical structure, and a piezoelectric motor, wherein the piezoelectric motor comprises:

a vibration exciter; and a resonator comprising a main body portion and a push portion, wherein the main body portion comprises a first central axis, and the main body portion is distributed on two sides of the first central axis, the vibration exciter is fastened to the main body portion, the push portion is connected to the main body portion and distributed on the two sides of the first central axis, and the push portion is of an asymmetrical structure with respect to the first central axis, and the push portion is configured to push, when excited by the vibration exciter, a driven member to move; and the resonator is fastened to the base, and the optical structure is fastened to the driven member, to move relative to the base when driven by the resonator.

20. The electronic device according to claim 19, wherein the push portion comprises a first side wall and a second side wall, a contact foot configured to come into contact with the driven member is formed at a junction between the first side wall and the second side wall, and the first side wall and the second side wall are arranged at an angle.

* * * * *